US009678949B2

(12) United States Patent
Monk, II et al.

(10) Patent No.: US 9,678,949 B2
(45) Date of Patent: Jun. 13, 2017

(54) VITAL TEXT ANALYTICS SYSTEM FOR THE ENHANCEMENT OF REQUIREMENTS ENGINEERING DOCUMENTS AND OTHER DOCUMENTS

(71) Applicants: Gordon H. Monk, II, Cape Elizabeth, ME (US); James Miller, Richland, WA (US); Donald A. Gooding, Falmouth, ME (US); Wayne Cowart, Portland, ME (US); Anthony Wing Kosner, Cape Elizabeth, ME (US)

(72) Inventors: Gordon H. Monk, II, Cape Elizabeth, ME (US); James Miller, Richland, WA (US); Donald A. Gooding, Falmouth, ME (US); Wayne Cowart, Portland, ME (US); Anthony Wing Kosner, Cape Elizabeth, ME (US)

(73) Assignee: CLOUD 9 LLC, Portland, ME (US)

( * ) Notice: Subject to any disclaimer, the term of this patent is extended or adjusted under 35 U.S.C. 154(b) by 640 days.

(21) Appl. No.: 14/106,667

(22) Filed: Dec. 13, 2013

(65) Prior Publication Data

US 2014/0172417 A1  Jun. 19, 2014

Related U.S. Application Data

(60) Provisional application No. 61/737,799, filed on Dec. 16, 2012.

(51) Int. Cl.
*G06F 17/20* (2006.01)
*G06F 17/27* (2006.01)

(52) U.S. Cl.
CPC ................ *G06F 17/2785* (2013.01)

(58) Field of Classification Search
CPC .... G06F 17/2785; G06F 17/27; G06F 17/277; G06F 17/30734; G06F 17/30412;
(Continued)

(56) References Cited

U.S. PATENT DOCUMENTS 5,371,807 A   12/1994 Register et al.
5,748,973 A   5/1998 Palmer et al.
(Continued)

OTHER PUBLICATIONS

Klein, Dan, and Christopher D. Manning. "Accurate Unlexicalized Parsing." Proceedings of the 41st Annual Meeting on Association for Computational Linguistics—ACL '03 (2003).
(Continued)

*Primary Examiner* — Michael Ortiz Sanchez
(74) *Attorney, Agent, or Firm* — Z IP Law PLLC; Claire Zopf

(57) ABSTRACT

A Vital Text Analytics System (VTAS), incorporating a repository of enterprise terms or concepts, is one that improves the readability and fidelity of technical specifications, instructions, training manuals requirements engineering documents and other related engineering documents, typically from a single organization or workgroup. The system stresses ontological analysis of a corpus of related documents, and applies a suite of computational tools that supports the identification and assessment of risk in evaluating the content of the documents, as well as providing statistical measures reflecting the frequency and severity of document features that threaten comprehension.

20 Claims, 14 Drawing Sheets

(58) Field of Classification Search
CPC .............. G06F 17/241; G06F 17/274; G06F 17/30011; G06F 17/30864; G06F 17/30539; G06F 17/30554; G06F 17/30572; G06F 17/30997; G06F 21/6218; G06F 17/3002; G06F 17/30038; G06N 5/022; G10L 13/10; G10L 15/18; G06Q 50/20
See application file for complete search history.

(56) References Cited

U.S. PATENT DOCUMENTS

| | | | | |
|---|---|---|---|---|
| 5,799,268 | A * | 8/1998 | Boguraev | G06F 17/2775 704/10 |
| 7,424,701 | B2 | 9/2008 | Kendall et al. | |
| 7,669,180 | B2 | 2/2010 | Bassin et al. | |
| 8,473,278 | B2 * | 6/2013 | Futagi | G06F 17/277 704/257 |
| 8,712,758 | B2 * | 4/2014 | Crouch | G06F 17/2765 704/1 |
| 9,202,176 | B1 * | 12/2015 | Kapur | G06N 99/005 |
| 9,348,815 | B1 * | 5/2016 | Estes | G06F 17/2785 |
| 2005/0049852 | A1 * | 3/2005 | Chao | G06F 17/2785 704/9 |
| 2005/0283751 | A1 * | 12/2005 | Bassin | G06Q 10/06 717/100 |
| 2006/0015934 | A1 * | 1/2006 | Wool | H04L 63/1433 726/11 |
| 2007/0112748 | A1 | 5/2007 | Angell et al. | |
| 2008/0005147 | A1 * | 1/2008 | Khushraj | G06F 17/30525 |
| 2008/0270120 | A1 * | 10/2008 | Pestian | G06F 17/2785 704/9 |
| 2009/0077531 | A1 | 3/2009 | Miloslavsky et al. | |
| 2009/0125872 | A1 | 5/2009 | Kannan et al. | |
| 2009/0234640 | A1 | 9/2009 | Boegl et al. | |
| 2010/0077386 | A1 * | 3/2010 | Akkiraju | G06F 8/35 717/136 |
| 2010/0115601 | A1 | 5/2010 | Brandstetter et al. | |
| 2010/0145678 | A1 * | 6/2010 | Csomai | G06F 17/2755 704/9 |
| 2010/0228693 | A1 * | 9/2010 | Dawson | G06F 17/2705 706/12 |
| 2010/0293617 | A1 | 11/2010 | Wool | |
| 2011/0087956 | A1 * | 4/2011 | Sherman | G09B 5/00 715/233 |
| 2011/0131076 | A1 * | 6/2011 | Leidner | G06Q 10/0635 705/7.28 |
| 2012/0221486 | A1 * | 8/2012 | Leidner | G06Q 40/08 705/36 R |
| 2012/0296845 | A1 * | 11/2012 | Andrews | G06F 17/2785 705/36 R |
| 2012/0316916 | A1 * | 12/2012 | Andrews | G06Q 40/08 705/7.28 |
| 2013/0138577 | A1 * | 5/2013 | Sisk | G06Q 30/02 705/36 R |
| 2013/0253910 | A1 * | 9/2013 | Turner | G06F 17/274 704/9 |
| 2013/0254126 | A1 * | 9/2013 | Koenig | G06Q 10/00 705/311 |
| 2013/0311481 | A1 * | 11/2013 | Bhatt | G06F 17/30321 707/741 |

OTHER PUBLICATIONS

Toutanova, Kristina, Dan Klein, Christopher D. Manning, and Yoram Singer. "Feature-rich Part-of-speech Tagging with a Cyclic Dependency Network." Proceedings of the 2003 Conference of the North American Chapter of the Association for Computational Linguistics on Human Language Technology—NAACL '03 (2003).
Missikoff, Michele, Roberto Navigli, and Paola Velardi. "The Usable Ontology: An Environment for Building and Assessing a Domain Ontology." The Semantic Web—ISWC 2002 Lecture Notes in Computer Science: 39-53.
Rochery, M., R. Schapire, M. Rahim, N. Gupta, G. Riccardi, S. Bangalore, H. Alshawi, and S. Douglas. "Combining Prior Knowledge and Boosting for Call Classification in Spoken Language Dialogue." IEEE International Conference on Acoustics Speech and Signal Processing (2002).
Mich, Luisa, and Roberto Garigliano. "Ambiguity Measures in Requirement Engineering." International Conference on Software Theory and Practice (2000).
Toutanova, Kristina, and Christopher D. Manning. "Enriching the Knowledge Sources Used in a Maximum Entropy Part-of-speech Tagger." Proceedings of the 2000 Joint SIGDAT Conference on Empirical Methods in Natural Language Processing and Very Large Corpora Held in Conjunction with the 38th Annual Meeting of the Association for Computational Linguistics—(2000).
Yamaguchi, Masaya, Takeyuki Kojima, Nobuo Inui, Yoshiyuki Kotani, and Hirohiko Nisimura. "Combination of an Automatic and an Interactive Disambiguation Method." Proceedings of the 36th Annual Meeting on Association for Computational Linguistics (1998).
Jiang, J. "Semantic Similarity Based on Corpus Statistics and Lexical Taxonomy." (1997).
Boitet, Christian, and Mutsuko Tomokiyo. "Theory and Practice of Ambiguity Labelling with a View to Interactive Disambiguation in Text and Speech MT." Proceedings of the 16th Conference on Computational Linguistics—(1996).
Yang, Hui, Alistair Willis, Anne De Roeck, and Bashar Nuseibeh. "Automatic Detection of Nocuous Coordination Ambiguities in Natural Language Requirements." Proceedings of the IEEE/ACM International Conference on Automated Software Engineering—ASE '10 (2010).
Yang, Hui, Anne De Roeck, Vincenzo Gervasi, Alistair Willis, and Bashar Nuseibeh. "Extending Nocuous Ambiguity Analysis for Anaphora in Natural Language Requirements." 2010 18th IEEE International Requirements Engineering Conference (2010).
Chantree, F., B. Nuseibeh, A. De Roeck, and A. Willis. "Identifying Nocuous Ambiguities in Natural Language Requirements." 14th IEEE International Requirements Engineering Conference (RE'06) (2006).
Girju, Roxana, Adriana Badulescu, and Dan Moldovan. "Automatic Discovery of Part-Whole Relations." Computational Linguistics (2006): 83-135.
Marneffe, Marie-Catherine De, Bill MacCartney, and Christopher Manning. "Generating Typed Dependency Parses from Phrase Structure Parses." Proceedings of LREC (2006).
Wasson, Kimberly. "Clear Requirements: Improving Validity Using Cognitive Linguistic Elicitation and Representation." A Dissertation Presented to the Faculty of the School of Engineering and Applied Science University of Virginia (2006).
Finkel, Jenny, Trond Grenager, and Christopher Manning. "Incorporating Non-local Information into Information Extraction Systems by Gibbs Sampling." (2005).
Jain, Prateek, Kunal Verma, Alex Kass, and Reymonrod G. Vasquez. "Automated Review of Natural Language Requirements Documents." Proceeding of the 2nd Annual Conference on India Software Engineering Conference—ISEC '09 (2005).
Breitman, K.k., and J.c.s. Do Prado Leite. "Ontology as a Requirements Engineering Product" Journal of Lightwave Technology (2003).
Mikolov, Tomas, Ilya Sutskever, Kai Chen, Greg Corrado, and Jeffrey Dean. "Distributed Representations of Words and Phrases and Their Compositionality." Advances in Neural Information Processing Systems (2013). Reference to be provided.
Milikov, Tomas, Kai Chen, Greg Corrado, and Jeffrey Dean. "Efficient Estimation of Word Representations in Vector Space." (2013).
Milikov, Tomas, Wen-tau Yih, and Geoffrey Zweig. "Linguistic Regularities in Continuous Space Word Representations." Proceedings of NAACL HLT (2013).
Socher, Richard, John Bauer, Christopher Manning, and Andrew Ng. "Parsing with Compositional Vector Grammars." Proceedings of the ACL Conference (2013).

(56) References Cited

OTHER PUBLICATIONS

Socher, Richard, Alex Perelygin, Jean Y. Wu, Jason Chuang, Christopher Manning, Andrew Ng, and Christopher Potts. "Recursive Deep Models for Semantic Compositionality Over a Sentiment Treebank." Proceedings of EMNLP (2013).
Berry, Daniel, Ricardo Gacitua, Pete Sawyer, and Sri Fatimah Tjong. "The Case for Dumb Requirements Engineering Tools." Requirements Engineering: Foundation for Software Quality Lecture Notes in Computer Science (2012): 211-17.
Verma, Kunal, Alex Kass, and Reymonrod Vasquez. "Using Syntactic and Semantic Analyses to Improve the Quality of Requirements Documentation." IOS Press (2012).
Yuret, D. "Fastsubs: An Efficient and Exact Procedure for Finding the Most Likely Lexical Substitutes Based on an N-Gram Language Model." IEEE Signal Process. Lett. IEEE Signal Processing Letters (2012): 725-28.
Yang, Hui, Anne De Roeck, Vincenzo Gervasi, Alistair Willis, and Bashar Nuseibeh. "Analysing Anaphoric Ambiguity in Natural Language Requirements." Requirements Engineering Requirements Eng (2011): 163-89.
Raghunathan, Karthik, Heeyoung Lee, Sudarshan Rangarajan, Nathanael Chambers, Mihai Surdeanu, Dan Jurafsky, and Christopher Manning. "A Multi-Pass Sieve for Coreference Resolution." Association for Computational Linguistics (2010).
Rehurek, Radim, and Petr Sojka. "Software Framework for Topic Modelling with Large Corpora." (2010).
Florian Lautenbacher, Bernhard Bauer, Tanja Sieber, and Alejandro Cabral, Linguistics Based Modeling Methods and Ontologies in Requirements Engineering, International Journal of Enterprise Information Systems, 6(1), 12-28, Jan.-Mar. 2010.
Florian Lautenbacher, Tanja Sieber, Alejandro Cabral, and Bernhard Bauer, Linguistics Modeling Methods and Ontologies in Requirements Engineering.
Hans-Jiirg Happel and Stefan Seedorf, Applications of Ontologies in Software Engineering, FZI Forschungszentrum Informatik, (2006).
Leonid Kof, Natural Language Processing for Requirements Engineering: Applicability to Large Requirements Documents, (2004).
Leonid Kof, Natural Language Processing: Mature Enough for Requirements Documents Analysis?.
Leonid Kof and Markus Pizka, Validating Documentation With Domain Ontologies, IOS Press, (2003).
Sven J. Korner and Torben Brumm, Improving Natural Language Specifications with Ontologies, Institute for Programming and Data Structures.
Sven J. Korner and Torben Brumm, Natural Language Specification Improvement with Ontologies, International Journal of Semantic Computing, vol. 3, No. 4 (2009) 445-470.
Veronica Castaneda, Luciana Ballejos, Ma. Laura Caliusco, Ma. Rosa Galli, The Use of Ontologies in Requirements Engineering, Global Journal of Researches in Engineering, vol. 10 Issue 6 (Ver LO) Nov. 2010.
Written Opinion and Search Report issued on Mar. 17, 2014 in PCT International Application No. PCT/US2013/075188 published as WO2014093935.
Verdon, Denis et al., "Risk Analysis in Software Design," IEEE Security & Privacy, vol. 2, Issue 4, pp. 79-84, Oct. 4, 2004.

* cited by examiner

VITAL TEXT ANALYTICS SYSTEM FOR THE ENHANCEMENT OF REQUIREMENTS ENGINEERING DOCUMENTS AND OTHER DOCUMENTS

CROSS REFERENCE TO RELATED APPLICATIONS

This application claims the benefit of U.S. Provisional Application No. 61/737,799 filed Dec. 16, 2012 entitled Concept Characteristics Management System for the Enhancement of Requirements Engineering Documents which is hereby incorporated in by reference in its entirety.

FIELD OF THE INVENTION

The present invention is a method and apparatus for a Vital Text Analytics System (VTAS) that improves the comprehensibility and fidelity of technical specifications, instructions, training manuals, engineering and other documents through a linguistic analysis of the lexical, syntactic, semantic, and pragmatic aspects of the text. More specifically the invention constitutes a computational Vital Text Analytics System that uses multiple layers of analysis based on a pedagogical curriculum referred to herein as the English 4 Engineers (E4E) framework. This framework organizes the interaction between the system and the user (document author), providing a framework for reporting analytical results to the user and for organizing the analysis process itself. The invention incorporates methods to identify these problematic features in the text and provides tools and resources that aid the author in understanding the nature of an identified problem in the text, determining how best to address the problem, and how to implement the needed change in such a way as to avoid introducing new difficulties by way of interactions with other parts of the document to enable the author(s) and other users to resolve these errors and improve the quality of the document. The invention provides a statistical ranking of the document quality according to a Vital Text Quality Index to allow authors to assess likely clarity and comprehensibility for those who must employ these documents for developing software and hardware solutions, or other activities that require technical language of great specificity.

BACKGROUND OF THE INVENTION

Requirements engineering is the process by which an organization formally identifies a need and defines the goals of a product or system it proposes to develop in response to that need. The process takes many forms and is applied with varying degrees of formality in organizations ranging from small software development shops to Fortune 500 corporations, as well as civilian and military government agencies. It is applied in defining physical products, software systems, complex transnational industrial systems and an unlimited variety of other projects. Successful requirements engineering accurately identifies the goals the client organization hopes to meet via the proposed system, determines and documents the functions the system will have to implement to satisfy those goals, identifies the interfaces and inputs the proposed system will depend upon, the intermediate and final products or outputs the system will generate, the form these inputs and outputs will take, the criteria the inputs and outputs must meet, and a wide range of other considerations that can bear on the success of the project.

Throughout these phases of product development, communications in document form are employed to explain operational and functional requirements, implementation strategies, risks, operating instructions, adherence to regulatory and industrial standards, and other engineering parameters. One or more individuals create this documentation based upon their areas of expertise and their knowledge of and experience with the development project. The documentation is developed for different levels of understanding of the project and for different audiences to interpret and use the information to develop, manufacture or use the products created.

A review of requirements engineering documentation created at the various levels may reveal the use of language and terminology consistent with the parlance and vernacular of closed groups that internally use these terms to describe the technology. These terms, whose unique meanings are only understood by the closed group, may be misunderstood by external readers who mistakenly assume their knowledge of the term's potential usages is complete. Commonly, the meaning of these terms may be misinterpreted or an insufficient explanation is provided within the documentation, because the closed groups have sufficient knowledge to understand the meaning and therefore do not expand, define or reiterate the importance of certain aspects of the requirements, because their meaning is accepted as common knowledge within the closed group. The misinterpretation and misunderstanding of critical requirements may have disastrous results where a user of the technology makes an incorrect decision based on their misinterpretation of instructions or operational parameters of the technology. Users of the technology may further misunderstand the unclear terms where their use is inconsistent, and possibly ambiguous to those outside of the closed group.

An excellent example of the importance of providing clear and broadly detailed requirements engineering documentation may have been provided by the 2009 crash of Air France Flight 447 in route from Rio de Janeiro to Paris. The precipitating cause of the accident was the icing of external sensors that caused the flight control computer to get inconsistent airspeed indications. That system had been designed to automatically return control of the aircraft to the crew in such an event. However, no one in the cockpit had ever manually flown an Airbus 330 (or a 330 simulator) at cruising speed and altitude, while facing anything much like the array of erroneous or contradictory instrument readings, warnings and alarms they then confronted. In this example, the design of the aircraft created implicit expectations for crew performance that were not recognized or adequately addressed in requirements for design of the training program for flight crews.

This example may be dramatic and tragic, but it is not isolated. It has been estimated that failures traceable to the requirements engineering process (e.g., vague, imprecise, incomplete, inconsistent, inaccurate or unrealistic requirements specifications) cause 40% of the defects that arise in projects. Poorly constructed requirements specifications fail to communicate fully and accurately the client's expectations to the engineers who are charged with realizing the client organization's desires. This failure can not only lead to disaster on occasion, but also to billions of dollars wasted on mitigation work needed to correct errors and deficiencies.

The most basic and general tool in the requirements engineering process is a human natural language (e.g., English, Japanese, Swahili). There are various efforts to insert artificial languages or graphical/symbolic systems into the process, but the fundamental goal of a requirements engineering exercise is to capture the needs and expectations of a group of human users, who typically also bring to the problem a fund of relevant expertise that the requirements engineering process must capture. The natural language (or languages) the user community shares serve as the medium in which they discuss, analyze, and amend the devices, systems and practices that will be replaced by the proposed new system. Not surprisingly then, the majority of requirements are stated in a natural language and they are formulated largely by way of extensive interactions in natural language between requirements engineers or business analysts and the user community. Sentences in a natural language then are both the raw material for the production of a requirements specification and the medium in which the requirements are stated.

Current commercially available requirements engineering tools are intended to help users develop higher quality requirements specifications, but they address this problem at the level of project management by:

A. helping engineers organize and review inputs to the requirements engineering process, B. providing tools for collecting and evaluating drafts of individual requirements, C. cataloging and tracking connections and interactions between different components, D. tracking requirements that have and have not been addressed once implementation begins, E. tracking the testing and evaluation of the implementation to ensure that the criteria associated with specific elements of the requirement are in fact met, F. and once a new system is fully deployed assisting in managing revisions to the requirements and the process of implementing and assessing the revisions.

These tools of the prior art, however, fail to assist in determining whether the requirements statements themselves are employing language that is clear and unambiguous, whether connections between different requirements are clearly articulated, whether there is consistency in the use of critical terms, whether conflicts or contradictions have been addressed and resolved, or whether the requirements accurately reflect the users' intentions and their expertise about the system to be developed. Some of the existing tools provide routine grammar- and spell-checking functions, but no existing product does anything to assess the quality, clarity and correctness of the requirements specification as a whole, as a textual language-driven document. Nor do they base their work upon research using valid linguistic and computational linguistic methods that identifies instances of language with high probability of miscommunication.

What is needed is a methodology that reduces defects caused by imprecise, vague, ambiguous, or incoherent linguistic communication in requirements specifications and other documents and a manner of identifying and storing unclear language, terminology and syntax to be used to amend and improve future documentation. Additionally, a method is needed that provides extensive interaction with all stakeholders of the system to increase their knowledge of terms (singly and in combination) and their implications and possible variety of meanings across the range of the application's use.

SUMMARY OF THE INVENTION

The method and apparatus of the present invention relates to a computational linguistic technology that can be brought to bear on core problems in requirements engineering and other documentation. These problems bear directly on the building of clear and coherent requirements specifications that may be used in the design, development, implementation and use of software and hardware technology products or other scientific or technical applications. The system of the present invention supports the discovery and identification of weaknesses in usage of a natural language used to describe a desired solution. Solutions, in the current implementation, include application software and hardware deliverables within an information technology (IT) organization or product deliverables within a corporate or other environment where a software and/or hardware solution is sold to others. In the following text the term solution applies equally to application (IT) and product (for sale) requirements documents that may be used to develop flow diagrams, schematics, inter-relationship models, design specifications, training manuals, and instructions to assist in the design, manufacture, implementation and/or coding of a software program, a mechanical apparatus, a computer controlled system, or other technology.

An analysis of these documents by the Vital Text Analytics System (VTAS) software application constitutes a viable method for reducing defects caused by imprecise or inaccurate communication in these requirements specifications. Specific issues occur in requirements specifications that lead to misunderstanding, reduced comprehension, an undermining of effectiveness, and a misrepresentation of relevant expertise. These issues may be identified and modifications to the text may be presented to correct or minimize potential misunderstandings by more clearly and comprehensively defining requirements. Other documents, such as annual reports, Food and Drug Administration (FDA) submission documents, other regulatory approval filings, medical evaluation documents and product development and design specifications may benefit from the Vital Text Analytics System (VTAS) where an analysis of terms within one or more documents will elucidate both broad and specific meanings of terms to assist in conveying concepts across both culturally and organizationally diverse users and consumers of varying expertise. In this vernacular, 'Culture' is defined as the culture of geographic nationality and origin, as well as the culture of occupational centricity where both may cause massive issues of miscommunication of language use in subject matter in any particular industrial area. Using the VTAS of the present invention that includes features such as the English 4 Engineers (E4E) framework, Natural Language Processing tools (NLP), Vital Text Concept Mapping (VTCM), and Vital Text Risk Assessment (VTRA) ambiguities and risk of miscomprehension within documents are identified and the frequency and relationships between these risks within a document are displayed to identify terms and phrases that may be problematic for comprehension. The VTAS further displays alternative explications of terms developed through both internal and external experts that allow an author or user to modify the use of terms within the document. Using these approaches, the VTAS supports the ability to quickly ascertain when a requirement may engage other concepts within the corporate repository, and therefore identify risks from misinterpretation of these terms. This capacity can also contribute to enhanced understanding and training for new employees or users.

Also importantly, the present invention provides a statistical ranking referred to herein as the Vital Text Quality Index (VTQI) that is aimed at assessing these risks using the frequency and severity of specific categories of ambiguities and related uncertainties, specifically lexical, syntactic, semantic, and categorical structural classes that are based on the identification of the relationship of terms through the contextual event and situational setting from the perspective of the reader using the E4E framework. Through this analysis, the potential risks identified are tagged and automatically assessed and marked within an extended form of the document called the Vital Text Computation Object (VTCO). Using the VTCO and risk assessment protocols, the VTQI is derived from an analyses of five distinct aspects of the document: (1) Syntactic Structure; (2) Transitional Probabilities; (3) Discourse and Pragmatic Structure Analysis; (4) Word Frequency, Collocation and Concordance Information; (5) Part-of-Speech (POS) Information; and (6) Associated Confidence Values. The VTQI score assists in identifying the inconsistencies and areas that may lead to the misinterpretation of similar concepts within a company or industrial area usage model and serves as a broad assessment of the clarity and intelligibility of a document or group of documents in a way that can be useful in project management, helping to determine for example, when a requirements document is mature enough to support the intended purpose or identifying the authors who most effectively achieve high quality documents.

In a first embodiment of the VTAS, implemented on a computer platform, the system may employ Vital Text Analytics System (VTAS) ontological analysis and decoding strategies to identify and support alternative language or linguistic structures increasing the effective comprehension of the resulting documents. The VTAS ontological analysis may further contribute to a "corporate or enterprise repository" created from the resources built within the context of the requirements analysis. An Ontological Library is used to collect within an Enterprise all the terms and concepts specific to the Enterprise. Through a process of explication development, the Ontological Library makes it possible for those employees and consumers using the requirements or other documents subjected to the VTAS analysis, to gain further clarification about terms and concepts employed in the Natural Language descriptions within the requirements text. Explications are a specific kind of definition that avoid common weaknesses of definitions produced by methods that define terms using words that require additional word meaning. Instead within the VTAS, explications are constructed from the use of the terms within one or more specific ontologies to encourage effective representation of information most critical for an employee, consumer, or user of the requirements document to understand. The data collected about the explications relates specifically to the corporate entity or technology field and the concepts that are accumulated through the VTAS linguistic analysis process and the meta-data gathered about those explications. The Vital Text Concept Library (VTCL) is fed by these explications of terms and concepts to further provide a condensed database of these terms and concepts which can be compared across Enterprise data from different operational entities and even completely different Enterprises where those Enterprises are willing to share their data for the benefit of gaining a broader conceptual understanding.

Realization of the corporate products and objectives are enhanced using the array of linguistic, cognitive science, and computational techniques, group and crowd sourcing methods, and other automated routines working in concert within the VTAS to evaluate the language within a requirements document or group of requirements documents for clarity. The automated support provided by the VTAS supplies the author, employee and consumer with a broad repository in the form of the Enterprise Ontological Library from which they may employ Group or Crowd sourcing methods to gain additional topological information regarding specific terms. The Ontological Library contains terms that may be chosen for further clarification. Through a manual review by a documents author or a VTAS data analyst directed by VTAS analysis findings and tools, specific terms and concepts that are found to be important to the comprehension of the document overall may be processed to create explications which provide a range of informative attributes and descriptive text. The explications are then connected to the document to support the reader in gaining additional insight into the term or concept by simply 'mousing' over the target word or words within the Vital Text Interface.

Group sourcing is restricted to those members within the technology community that have been selected by one or more authors or group source members who request the elicitation of information from these participants. Crowd sourcing is associated more broadly to users of the technology of the documents within the company. Having the terms available and the means to quickly and easily seek the group and crowd sourcing explicit expansion of the meaning of the terms provides a unique method for the consumer to gain, asynchronously, more information about the constructs within the document. The asynchronicity of the review is important, as research shows, because it allows respondents to manage their interactions more aligned with their schedules. As the reviewers respond to the requests for additional clarifying information additional Ontological understanding may evolve resulting in expansion of the Ontological Library. Further, expansion of the Ontological Library across additional operational groups and even Enterprises begins to form industrial and sub-industrial categories of ontological content providing even further understanding and topological mapping. Using these features of the VTAS, a circular evolution creates opportunities for advanced understanding of these concepts for authors and users of the documents.

Still further, the Ontological Library is employed to 'shop' terms using the group and crowd sourcing methods to gain explicit descriptions from universes of specialists to collect all understanding into one or more expansive repository within the Vital Text Concept Library (VTCL). Crowd sourcing and refinements of it may be implemented as well as other methodologies to aggregate the information obtained from multiple sources. The data provided may come from within a closed group associated with a specific technology. The data may be obtained from one or more inventors, engineers, experts, or specialists within a closed group through a compilation of explication templates, other requirements documents, technology specific publications, or other sources.

Using the VTAS linguistic analysis process, the system further provides enhanced, ongoing assessment, articulation and better integration of the concepts underlying the company's express needs found in the requirements. As requirements are evaluated, the VTAS offers tools that support the discovery of alternative and/or enhanced terms and phrasing that improve comprehension of the requirements document.

For example, in a first embodiment, one or more requirements engineering documents may be decoded, identifying commonly used terminology such as specific critical terms used within the Enterprise. Select terms may be displayed and color coded on the Concept Map. In one example, the VTAS using the Concept Map would identify where terms are used inconsistently or broken links in relationships, where an expression introduced at the beginning of the document implies a relationship that fails to be carried through to the end of the document. The VTAS further comprises processes of linguistic analyses that are organized around the principles of the English 4 Engineers (E4E) framework. The E4E framework provides a broad-spectrum tool for critiquing technical documents by considering the fundamental problem of comprehension from a reader's perspective and the skills of the author or authors in clearly presenting the information. This central task provides the organizing focus of the VTAS and affects the text analysis process from its earliest stages through to the presentation of the results of the analysis to the author of the document. Writers of technical documents often have relatively little training as writers, do not have a useful common vocabulary for discussing many of the issues that affect text quality, and in a significant number of instances may not be native speakers of the target language. Given these constraints, the VTAS provides value to a company's corpus by detecting problematic features in a text, identifying the problems they raise, offering possible solutions to those problems and effectively communicating this information to the author and the Enterprise users of the documents. The E4E framework is the integral part of the VTI that offers this opportunity for the author to investigate problematic text features at greater depth.

The core device by which texts convey rich and precise information to readers is the sentence, and the core difficulty in reporting problems to authors is that many writers have a relatively weak sense of what sentences are. Writers are often unclear on what constitutes a sentence, how sentences function, how the components of a sentence can be elaborated, how multiple sentences can be worked into a complex sentence structure, and how sentences, individually and collectively across a text, can reliably convey complex information. Even relatively proficient writers often have a weak explicit grasp of sentence structure and function. These limitations constitute a significant barrier to communication about problems in a text.

The E4E framework includes the Vital Text Sentence Model (VTSM), which represents sentences through three distinct layers comprising the nominal, predicative and situational aspects of language. E4E explains how each of these layers is elaborated to produce sentences of any possible level of complexity. Further, E4E includes the Vital Text Document Model (VTDM) which identifies the ways that sentences and sections of text relate to one another, the ways that references are maintained or undermined throughout a document, or a corpus of documents, and the ways that conceptual features extrinsic to a given sentence can affect its range of potential interpretations by a reader. The VTAS using the E4E framework provides a basis for adding an unlimited number of analytical and presentational modules that can help writers improve the probability that the intended meaning of the document will be communicated to the intended audience clearly and without significant error. These modules may run in parallel or in sequence, and may be turned on or off or given differential weightings for different kinds of documents, domains, organizations, industries or audiences.

The goal of the VTAS is not to repair or re-engineer submitted documents, since this task typically requires the special expertise, knowledge of project goals and constraints, and situational knowledge of the author. Rather the goal of the VTAS is to identify and report problematic features of a document and support the process of resolving those difficulties. The Vital Text Interface (VTI) that is displayed to the author and Enterprise users provides clear information that allows them to readily see the issue in the source text, understand the nature of the difficulty, and access whatever further support may be relevant to address the issue.

Through the Vital Text Analytics System (VTAS) analysis, each term and definition within the Vital Text Concept Library (VTCL) database is tagged with specific meta-data that includes source information, frequency and prioritization of usage of the term within the set of requirements documents. These attributes are used to group and isolate concepts within a consideration of two dimensions; where a first dimension is concepts employed at greater depth versus a second dimension of concepts employed at greater breadth in the document(s). Some terms and concepts are more at risk for misunderstanding than others. Further, the manner in which a term is distributed through a document affects how likely it is to produce a misunderstanding. The use of these data structures and the global comparison of terms provides for the identification of sets of company specific terms employed within the corporation's documents. This supports a corporate commitment to use a specified vocabulary and shared knowledge base consistently.

Using the ontological analysis system within the VTAS, terminology is selected for the corporate dictionary based on a variety of linguistic features and statistical analyses, including frequency, distribution, collocations, N-gram structure, parse trees, and many others. Often VTAS employs existing tools and applications to acquire source data that is later employed with specific algorithms unique to the VTAS processing methods. For example, Stanford CoreNLP provides a set of natural language processing tools that take text as input and marks up its structure in terms of word relations by pointing out names, locations and dates. Also, the Stanford CoreNLP is a natural language parser that can identify the grammatical structure of the text. It could, for instance, provide several possible "tree" structures of a sentence and calculate the probability of each of them being the actual (intended) structure, thus it can find structures that are potentially ambiguous.

The VTAS within the E4E framework applies and expands upon the syntactic and structural analysis to create relationships between the constituents of the requirements document so that all implied relationships between functional elements of the document are explicitly recognized. If an entity or its constituents are not linked in the requirements or in external documents then a link should be identified or alternatively be evaluated and if necessary the link be deleted. For example, the VTAS system may scan, identify and record the world of conceptual terms and phrases that exist within requirements engineering documents. It may also define specific entities as things related to both exclusive company terminology and to describe broadly accepted concepts within a specific technology field or industry. An ontological analysis within the VTAS identifies these suspected things and flags them for later inspection. The VTAS also incorporates meta-data using the E4E framework including their frequency, location and distribution within a document using a unique document identifier, and paragraph and line locators. Ontological reporting may further provide term variants or Z-Lemma information that may be used to identify morphological forms of a term within a document. Concordance algorithms within the VTAS further group and index the targeted terms in a relational manner within their context of usage based on the action and use in time of the terms. The Natural Language facets of a requirements document such as similar parts of speech, collocations, concordance values, conceptual relationships and other data are aggregated in a Vital Text Computation Object (VTCO) that is used in conjunction with the sentence constructs identified using the E4E framework to clarify actions and display risk elements to an author or data analyst that may require further clarification to support enhanced comprehension by the employee, the consumer and other users of the document.

The collected data and meta-data enhancements develop a characteristic and persona for each salient term of interest. A persona, in the word's everyday usage, is a social role or a character played by an actor. The word is derived from Latin, where it originally referred to a theatrical mask. The Latin word probably derived from the Etruscan word "phersu", with the same meaning, and that from the Greek πρόσωπον (prosōpon). Its meaning in the latter Roman period changed to indicate a "character" of a theatrical performance or court of law, when it became apparent that different individuals could assume the same role, and legal attributes such as rights, powers, and duties followed the role, and that the same individuals as actors could play different roles, each with its own legal attributes, sometimes even in the same court appearance.

The 'persona' or character of a term is documented by the ontological analysis and E4E framework constructions. This is done by establishing a term's usage relative to other terms within the document or within one or more documents, and by evaluating the term's occurrences, depth and breadth. To assist in describing a concept that has multiple personae across different parts of a company it may be considered in terms of concepts wearing different 'masks', depending on the context within the company. Examining the notion of personae from a different point of view with a practical example, consider a simple practice of using 'red', 'yellow' and 'green' to describe the status of a project. Someone could say: "Project 1 is red" to express its status—cancelled (for example). Or someone could say: "Project 2 is green", as in "Project 2 is finished as planned". This may conflict with other usage of these color terms as indicators to describe the stages of development of a project, as now someone could say "Project 3 is red", where "red" means "at an early stage". Or in a completely different way to identify the results of a particular medical test. Someone could say "The test is red" to outline the results of a test, but somebody else would think the meaning was "The test was cancelled". In each example the RED indicator implies a "Stop" condition or a "DANGER" condition as is known from stoplights at intersections. But, in the example the REASON they are applied may be different for each case. In that interpretation RED may be some value was out of range in one situation and in another some process was not concluded correctly. The color terms therefore now have distinct conceptual roles when used in these different contexts, opening a door for confusion or misinterpretation.

Characterizing the personae (salient terms) associated with each concept through the analysis and indexing methods of the VTAS, the system may also assist authors of the requirements documents by recognizing and signaling when terminology is selected that is outside the customary usage stored within the corporate dictionary and management system. The VTAS exposes intersecting points of contextual contact and relationships with other concepts and elements that may be unknown to the author and may present these in real-time as the document is being written as optional choices in using the corporate nomenclature. By building this information, the VTAS assists in defining the focus and scope of the concept desired to be conveyed within one or more specific documents thereby providing information relative to all other things that exist within the document or within the corporate enterprise. The unique contribution of the VTAS is the ability to identify these masks and provide the many attributes and aspects of the personae of a particular term or concept and to clearly articulate the nature and context of usage in each instantiation using a variety of techniques and media.

The VTAS further provides the VTQI ranking that allows for comparison of a single requirements document with respect to classes of risk patterns or defects within a defect database. In many cases, the language that is weak or in one way or another not optimal will be found to strongly correlate with one or more classes of risk patterns that are discovered during industry standard verification and validation activities where requirements are realized and implemented. In examining the risk patterns classes a range or collection of defects that commonly occur may be identified.

As an example, in the validation of newly developed software applications, defects occur because software code is commonly a collection of repetitive operations across the domain of requirements. In validating the code, test cases are created to test each requirement and are linked to the requirement using a 'traceability' matrix provided by most Requirements Management Systems. Defects are identified where the implemented software code does not meet the requirements. These defects result in functional failures in the implementation of the software and because software code is a collection of repetitive operations, a defect caused by a single ambiguity in the requirements documents can result in multiple failures within the implementation. The VTAS analyzes these ambiguities against defects identified within the verification and validation reports and applies a correlation that quantifies the VTQI ranking.

The VTQI ranking further provides a baseline of the frequency of risk within a document based on battery of analyses that are aimed at assessing the frequency and severity of specific categories of ambiguities and related uncertainties, specifically lexical, syntactic, semantic, categorical ambiguities, and relational context of the nominal, the action and the situational setting. For example, using the analytical tools of the VTAS transitional probabilities and word frequency, collocation and concordance information is collected and evaluated to develop a statistical profile of individual terms. This analysis may then be used to select risk patterns that when compared to norms may contribute to highlight eccentric or critically distinctive usages that may lead to ambiguities. The inclusion of various statistical estimates associated with the probability of a given risk element in a given environment can help to identify where there may be challenges to comprehension. Through this analysis, these tagged sentence constructs pointing to potential risk elements are automatically assessed and marked in the VTCO and integrated into the document's VTQI score. This analysis and tagging may clearly identify problems in comprehension and thereby affect the document's overall VTQI score. As examples, if a risk pattern presents a confusing modifier linked with two separate terms, or a circular or obscure terminology is used to define one unique term or acronym by using another unique term or acronym; or a concept or representative term is not structurally well defined or a missing component reference is not found where it may be reasonably expected to occur, then each instance of these risk elements will be tagged in the VTCO and a statistical ranking will be given that will increase the overall VTQI score for the document.

The calculated value and ranking of requirements document using the Vital Text Quality Index (VTQI) is an important feature of the VTAS analysis tools of the present invention where it provides an index for valuing a document by the risks that may result from misunderstandings, failure or misuse of the software or technology product from poorly defined concepts. These misunderstandings may result in oversights or omissions in design, injury to the user, or users, or damage to the product. To evaluate and measure these risks the VTAS application software performs an analysis of many conditions that are known to increase a level of risk, for example language within the requirements that has previously been found to correlate to specific types of defects in software. This comprehensive analysis and ranking is a very important aspect of the present invention.

The VTAS application software further presents alternative representations of definitions and construction of terms by developing a topology of each of the specific terms. Topology may be defined as an object or family of objects having certain properties or attributes that are preserved as an object is transformed. These attributes may be within a range from generally known to more specific attributes associated with a specialized use of the object. For example consider the following term, "chair", and how each of the five attributes may generally or more specifically define the object:

Chair

1) A structure for sitting

2) A back, four legs, a horizontal surface sitting atop the four legs, wheels for rolling about as one is seated, arm rests, cushions or padding to make sitting for extended periods more comfortable.

3) Use within a dental office domain may evoke, " . . . able to be raised or lowered by one's foot . . . ", or " . . . able to be leaned back so the seated individual is almost horizontal . . . ", or " . . . accompanied by a number of attach points for accessories . . . ".

4) Use within a dental office waiting room may evoke " . . . not able to be raised or lowered by one's foot . . . ", or " . . . unable to be reclined . . . ", etc.

5) Use within a dental office may evoke higher level provocations of medical furniture, dental furniture, special purpose furniture and lower level provocations of dental chair for dental surgery, for orthodontia, for general dentistry, for pediatric dental care.

Understanding the topology a specific term or phrase occupies within a domain or category of relevant terms or concepts is vital to communicating the meaning of the specific term or an underlying concept accurately. Through manual and automated analysis and a compilation of attributes that are comprehensively identified using the E4E framework, a suspect phrase may be properly targeted and categorized relative to its relationships and place within the communication hierarchy. Attributes may be collected through explication templates with experts within the company or within the industry. Attributes may also be collected from novices or peripheral users of the technology with less information about the technology and terminology. Other resources such as industry journals, patents, corporate documentation, dictionaries, etc. may also be used to broaden categorization of the targeted terminology.

The compilation of the explications and contextual information results in the identification of diverse interpretations where for example a first interpretation may present a lengthy explication from an expert working within a company where the terms used are narrow and specific within the group of experts, however open to multiple interpretations (roles) when a novice interprets the definition provided within a much broader scope. The separation of an expert category topology that contains narrower mid-line mapping or scope always exists and must be targeted to provide additional context and more specific detail for a novice. The E4E framework, Concept Map, VTQI ranking and other supporting modules within the VTAS assist in mapping out the relationships, usage and context of terms within both the expert and novice usage ranges by identifying gaps and disconnections with these terminology relationships that may result in risk elements.

Consequently, the broader relational mapping presents the opportunity for a normalization of usage to create palatable conceptual terms and descriptions that take into account the audience requiring the information. The VTAS performs the task of detecting the conceptual usage of a term or concept within a document and presents optional explications in order to re-align the novice user or consumer with the expert's level of communication. This may be accomplished through a variety of methods such as by presenting iterative representations of a term based on the optional explications that guide the novice to effectively arrive at the level upon which the expert is communicating. The identification of this requirement for the proper level of understanding and evaluation of the contextual attributes using the Vital Text Computation Object (VTCO) and other tools employed by the VTAS is a critically important feature of the VTAS in adapting requirements engineering terminology for the specific contextual users of the information.

In computationally deriving the Vital Text Concept Library (VTCL), other factors related to the contextual attributes of the knowledge, experience and familiarity of the employees, consumers and other users, and the reported information may be used to construct a hierarchical representation of the attributes that may rank the clarity of a series of explications that range from most general to most specific. For example, attributes most immediately reported by informants are given a higher ranking with respect to the term or target phrase than those provided in later recollections. A high ranking may also be assigned to attributes that may be reported by domain specific respondents defining terms which may be more relevant to the specific use of the target phrase. A clear and concise explication developed by a person having special skill or knowledge derived from training or experience as it pertains to the target phrase may be given moderate ranking. While attributes that may be relevant in a general use of the salient phrase but are irrelevant in the specific usage of the salient phrase may be given a low ranking. Compiled attributes may be presented in a hierarchical structure from more specific to more general terms associated with the salient phrase to assist a data analyst in validating the risk assessment of the salient phrase and associated concepts.

A reduction in significant errors in specifying the concepts which define a company's needs will also be achieved where the system may provide an option to switch among the original or one or more sets of alternative terminology and phrasing to define a particular concept. Using the Concept Library (VTCL), information may be provided on known risks in terminology usage to adopt clearer and more comprehensive definitions and usage much earlier on in a development project. The alternative language and optional definitions through explications may be passively accepted or actively selected from suggested enhancements based on the original language. Enhancements displayed using the Vital Text Interface are accompanied by supporting linguistic and cognitive reasons developed from the term attributes and explications within the Vital Text Computation Object (VTCO) and Vital Text Concept Library (VTCL).

Greater clarity and efficiency in writing and annotating test objectives, requirements and results will reduce time and iterative corrections to, for example, software code, mechanical tolerances, or the interaction between components within an electrical or mechanical system. Particularly, an analysis of the software requirements by the VTAS may provide enhanced traceability of source code terms and language elements and related product documentation, facilitating the maintenance, modification and adaptation of the software product or its reusable components used in the design and implementation of the requirements. Improvements will also be seen in the resulting architecture and system component design documents drafted by solution architects and software engineers, and the source code engineered to deliver the computerized functionality desired by the stakeholders within the company. The E4E framework may further provide instructional methods that will result in a substantial enhancement of the methods most often employed today in the requirements engineering and software development process and will help in eradicating defects resulting from errors currently inherent due to the lack of methods and understanding of linguistic challenges which directly enhance comprehension of the natural language employed within the requirements specifications by authors, employees, consumers and other users of the requirements language and/or any written text articulating concepts or information vital to an ancillary operation or activity where miscommunication is critical to avoid.

One object of the present invention is to implement a software development tool set on a computer platform that enhances the comprehension of requirements or other documents by more clearly presenting the most relevant concepts. The VTAS tool set within the E4E framework will provide the capacity to develop more accurate and complete requirements and design specifications for software programs and other technology products which will result in faster implementation and greater alignment of the user-interface and the operational capabilities of, for example, a software product, or improvements in manufacturability or training and use of a technology product according to the design specifications, with measurable fidelity to the company's express specifications.

An object of the present invention is the use of the E4E framework to create of a series of software application modules that identify the ways that sentence constructs and sections of text relate to one another, and the ways that salient terms and references are maintained or undermined throughout a document, or a corpus of documents.

Another object of the present invention is the creation of a Vital Text Concept Library (VTCL) within each specific company corporate domain containing meta-data associated with each of the many terms and underlying concepts employed within a corporation's requirements documents.

Another object of the invention is the prioritization of usage of these concepts that define stakeholder needs providing the capacity to focus risk mitigation resources across two dimensions of depth and breadth in the written materials.

Another object of the present invention is the reduction of risk associated with communication failures in requirements and other documents for software and hardware solutions by using substantially more effectively constructed terminology supplied by the Vital Text Analytics System of the present invention.

Another object of the present invention is a determination of targeted terms using the E4E framework and Vital Text Computation Object (VTCO) that comprehensively presents, compares and evaluates all of the contextual attributes applied to the requirements document using the VTAS analysis software.

Another object of the present invention is the development of a Concept Map that visually presents the relationships between salient terms that may be identified as nouns, verbs, adjectives, possessives and other parts of speech.

Another object of the present invention is to present iterative representations that are adapted to the knowledge, experience and familiarity of the readers of the requirements documentation.

Another object of the present invention is the creation of a collection of all terms employed within the processed documents to create one or more of a company, corporate or public enterprise ontology.

Another object of the present invention is the grouping of similar representations in a category topology to align definitions of terms by expert users with interpretation of terms by novice users.

A further object is the development of more accurate and complete requirements for software and hardware design specifications.

A further object is greater efficiency in writing, annotating and testing of software code based on the improved design specifications.

A still further object of the present invention is a reduction in defects resulting from identified risk elements currently inherent in the lack of methods which directly enhance the natural language employed within the requirements documents and specifications.

Still further objects of the present invention is an improvement in readability and understanding of documents in order to reduce rework that must be performed as a consequence of fixing unknown defects.

A still further object of the present invention is a substantial enhancement of the methods most often employed today in the requirements engineering and software development process.

A still further object of the present invention is the intersection of applications and disciplines used within a Master Data Management, Requirements Engineering, Application Lifecycle Management and other software and hardware engineering tools and systems.

A still further object of the present invention is a risk assessment ranking of salient terms and phrases based on a Vital Text Quality Index that quantifies through a distinct, reproducible and consistent process the level of risk that a specific requirements or other document may have due to defects in terminology.

A still further object of the present invention is the presentation of a hierarchical, topological structure of general and specific usage of salient phrases.

The present invention relates to a risk assessment software analysis system, comprising application software installed on a computer system, the application software comprising, a repository storing requirements documents, a sentence model processing tool annotating within a computational object module parts of speech from the text of at least one requirements document as one of at least a pointer, a linker, and a situator, a risk detector applying risk patterns based on a relationship between all or a part of any text annotated as a pointer, linker, and situator and other annotated text to identify risk elements as any text from the document matching at least one of the risk patterns, a risk assessor applying a severity of risk value to at least one identified risk element, and wherein the risk patterns represent text capable of ambiguity and misinterpretation as applied to the text.

In the risk assessment software analysis system at least one of the pointer, the linker, and the situator comprise terms based on a framework of structural classes that are developed from the cognitive functions that are invoked in a reader in reading the text of the requirements document. The risk assessment software analysis system further comprises a document model processing tool that identifies the text of the risk element within the text of the entire document; and uses the text to develop a document ontology. The risk assessment software analysis system further comprises a corpus model processing tool that identifies the text of the risk element within the text of an entire corpus of documents, and uses the text to develop a corporate ontology. In the risk assessment software analysis system the severity of risk value is determined by the risk assessor from the usage of the text of the risk element in one of at least the entire document and entire corpus of documents.

The risk assessment software analysis system further comprising a quality index determined using the risk assessor from the value of the severity of risk of all risk elements within one of at least the entire document and entire corpus of documents. The risk assessment software analysis system of further comprises a concept library, and in which using the application software, data is collected from a series of linguistic analyses of terms from one or more requirements documents, the data is aggregated to identify salient terms that are stored as an ontological list in the concept library, and the salient terms are used to develop explications and alternative representations through one of at least group sourcing, crowd sourcing, and external resources.

The risk assessment software analysis system further comprises the development of at least one explication template that includes attributes of the salient terms and the attributes are comprehensively identified based on a topology of the salient terms within a domain or category of relevant terms or concepts and the topology is used to contribute to the corporate ontology. The risk assessment software analysis system further comprises an interface for the display of training materials within a curriculum including the explications and alternate representations within the one or more requirements documents to offer alternative text to replace the text of one or more risk elements identified within the one or more requirements documents. In the risk assessment software analysis system, the collected data from the series of linguistic analyses includes one of at least frequency of occurrence, location, concordance values, collocation, depth of occurrence, breadth of occurrence data. The risk assessment software analysis system of further comprises a concept map; and the relationships of the salient terms are mapped within the concept map and the collected data in the concept map is shaped and color coded based on threshold settings.

The present invention is further related to a method of identifying and assessing risks within a requirements document using a software analysis system, comprising the steps of parsing text from one or more requirements documents using a software application system installed on a computer platform; converting the text to a machine readable format; performing a plurality of linguistics analyses on the formatted text including the identification of parts of speech; annotating the parts of speech identified within the text from at least one requirements document with one of at least a pointer, a linker, and a situator; integrating the results of a plurality of linguistics analyses performed and the annotations of the text from at least one sentence into a computational object module; applying risk patterns based on the relationships between all or a part of the text annotated as one of at least a pointer, a linker, and a situator and other annotated text, the risk patterns capable of representing ambiguities and misinterpretations; identifying risk elements as annotated text matching an applied risk pattern.

The method of identifying and assessing risks within a requirements document using a software analysis system further comprises the steps of highlighting the one or more identified risk elements in the one or more requirements documents; and assessing the one or more risk elements for severity of risk based on the quality of the matching of the risk element to the risk pattern.

The method of identifying and assessing risks within a requirements document using a software analysis system further comprises the steps of compiling at least one ontological list of salient terms from the one or more requirements documents and developing a explication template that includes attributes of the salient terms and the attributes are comprehensively identified based on the topology of the salient terms within a domain or category of relevant terms or concepts. The method of identifying and assessing risks within a requirements document using a software analysis system further comprises the step of constructing explications for the salient terms from the explication templates completed by one or more experts. The method of identifying and assessing risks within a requirements document using a software analysis system further comprises the step of storing the one or more of the explications within a concept library. The method of identifying and assessing risks within a requirements document using a software analysis system further comprising the step of developing a topology from the one or more identified risk elements and explications to construct an ontology and one or more alternate ontologies. The method of identifying and assessing risks within a requirements document using a software analysis system further comprising the steps of ranking the requirements document based on the one or more identified risk elements and explications; and displaying the ranking within the one or more requirements documents. The method of identifying and assessing risks within a requirements document using a software analysis system further comprising the step of displaying the explications as text to replace a risk element in the one or more requirements documents.

These and other features, advantages and improvements according to this invention will be better understood by reference to the following detailed description and accompanying drawings.

BRIEF DESCRIPTION OF THE DRAWINGS

Several embodiments of the present invention will now be described by way of example only, with reference to the accompanying drawings in which.

DETAILED DESCRIPTION OF THE INVENTION

Figure 1:
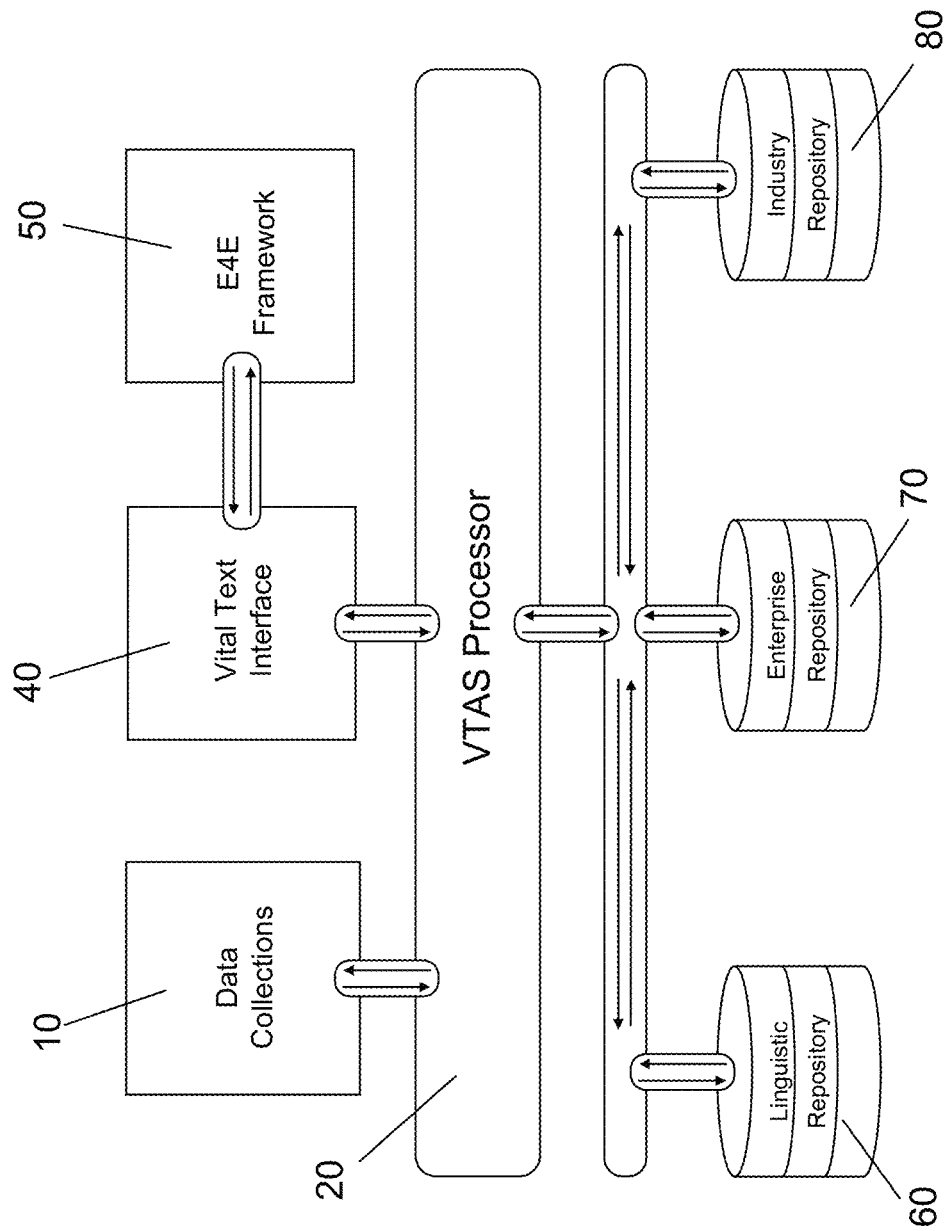
FIG. 1 is a block diagram of some of the modules used in an embodiment of the Vital Text Analytics System (VTAS) of the present invention.

In the method and apparatus, a concept characteristic management Vital Text Analytics System (VTAS) software application implemented on a computer platform using an internet or intranet based application software is described. The Vital Text Analytics System (VTAS) processing software 20 comprises analytical tools that apply constructs derived from the E4E framework 50 to analyze documents stored within a data collection module 10 based on terminology and expressions stored within repositories that may include a Linguistic Repository 60, an Enterprise Repository 70 and an Industry Repository 80 as shown in FIG. 1.

Figure 2:
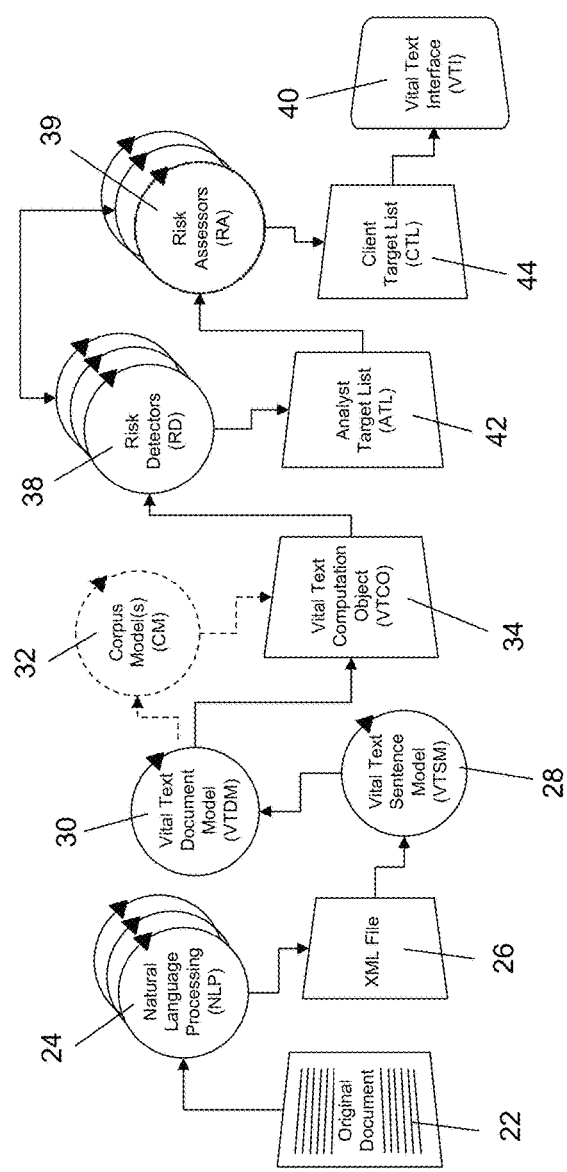
FIG. 2 is a flow diagram of some of the process steps of an embodiment of the VTAS of the present invention.

A user of the VTAS 20 may be the author or authors of the document within a company requiring an analysis of one or more of their corpus documents. As shown in FIG. 2, the original document 22 is submitted from the user in a variety of formats (e.g. .doc, .docx, .pdf, etc.) and uploaded to a secure server. The original document 22 is converted into a standard plain text format and words, phrases and sentences are marked up using a number of Natural Language Processing NLP algorithms 24 integrated within the VTAS. These lemmatize the lexical material, insert Part of Speech (POS) tags, do Named Entity Recognition (NER), construct one or more syntactic analyses of each sentence, and perform various other preliminary analyses. The results of all of these analyses are encoded in an XML format 26 in a new document. Lemmatizing lexical material means to determine what lemma each word form is associated with. Thus, walk, walks, walked, and walking are all taken to be variant realizations of the same lemma, walk, and are annotated in the XML format 26.

In a further processing step, the Vital Text Sentence Model (VTSM) 28 further guides mark up the XML formatted file 26 to tag structural classes 43 as defined within the E4E framework 50. For example, arguments of the matrix linker 47 in each sentence are distinguished from more deeply embedded pointers 45, and indexes of the complexity of the matrix arguments are constructed. After the sentence by sentence analyses is run and the XML file 26 is appropriately tagged according to the VTSM process 28, the collection of all sentences (i.e., the text) is run through another process using the Vital Text Document Model (VTDM) 30 to extend the analysis through groups of related sentences or sections to develop one or more ontologies or other higher level analyses of the document. As in the previous step, in the Vital Text Document Model (VTDM) processing step 30 adds a set of text-level tags to the XML document 26 to facilitate the application of the E4E framework to the document as a whole.

Here of particular note is the development of secondary ontologies derived via the VTDM 30 that assist in estimating what aspects of a primary ontology of the document are likely to be shared by readers approaching from various backgrounds and perspectives. These alternate ontologies generally draw upon corpora representing typical documents in relevant domains distinct from that of the primary document 22. Further processing may be performed through an analysis using one or more collections of documents found within the Enterprise Repository 70, or the Industry Repository 80, each of these drawing upon a Corpus Model (CM) 32 analysis. The Corpus Model (CM) may assist in estimating typical usage of salient terms in various definable domains relevant to the primary document 22 or to communities of prospective readers that may need to read the primary document 22. The CM 32 processing of relevant documents may identify elements that are used idiosyncratically relative to current practice in an industry or some relevant technical domain.

The results of the NLP, VTSM, VTDM and/or the CM processing analyses are incorporated in the Vital Text Computation Object (VTCO) 34 that is in a heavily annotated XML format. The VTCO 34 is stored in a VTAS process server 19. The VTCO 34 is in effect a multi-layered document with tagging that includes each word-level element of the original source document 22, along with tagging indicating its relation to each of the distinct layers derived from the E4E framework 50. Using the VTCO 34 each word-level element (as well as larger structures) can be considered in relation to a single layer of the model or be simultaneously examined by a data analyst 48 to determine the element's impact on the multiple layers and structures within the document.

The Vital Text Computational Object (VTCO) 34, which is an extensively tagged version of the original document 22 further becomes the basis for applying the Risk Detector (RD) 38 and Risk Assessor (RA) 39 processes to the document 22. The Risk Detectors (RD) 38 apply Risk Patterns 63 whose Risk Elements 65 have been shown to be capable of introducing one or another kind of risk of misinterpretation that presents an ambiguity or interpretive uncertainty into the document 22. The identified Risk Elements 65 with all of the markups inserted by the Risk Detectors 38 are integrated into an Analyst Target List (ATL) 42 that includes all of the original markup of the VTCO 34.

The ATL 42 is the most comprehensive representation of possible problematic features of the document 22.

The Risk Assessors (RA) 39 are processes instantiating various machine learning algorithms. These processors take advantage of a) studies of human performance with the Risk Elements 65 in question, b) a variety of other relevant measures of the context in which each Risk Element 65 introduces, and c) specific details of the way each particular Risk Element 65 is lexically or structurally realized. Each Risk Assessor (RA) 39 assigns a rating to each Risk Element 65 indicating the estimated probability that the specific instance will induce significant uncertainty for readers. In some instances, further information indicating which particular possible interpretations or analyses are most likely can also be reported by the RA 39. The class of Risk Elements 65 marked by each RD 38 will have at least one RA 39 that assesses the degree of risk associated with each tagged instance of that Risk Pattern type. However, RAs operate on the VTCO 34 and can be defined to take advantage of any of the information found there, including tagging that is derived from multiple Risk Patterns 63 developed by various Risk Detectors (RD) 38. Risk Assessors (RA) 39 are also able to examine Risk Elements 65 in relation to multiple relevant document ontologies, representing both the author's intent and the various baseline ontologies that various classes of reader may bring to the text.

The results of the Risk Assessor 39 processes consist of a highly filtered and ranked Client Target List (CTL) 44 that lists the Risk Elements 65 in the primary document 22 that are considered highly likely to induce misinterpretation or other problems. The CTL 44 is designed primarily to contribute to an iterative process of document review by an author, employee, or another user of the document 22 by highlighting the most critical Risk Elements 65 and issues identified by the Risk Assessors 39. The Client Target List (CTL) 44 is incorporated within and displayed through the Vital Text Interface (VTI) 40 that allows an author to review the identified Risk Elements 65 with the original text of the document 22.

Some embodiments of the present invention will be described in terms that would ordinarily be implemented as software programs. Those skilled in the art will readily recognize that the equivalent of such software may also be constructed in computer, electrical and communications hardware. Because data manipulation algorithms and systems are well known, the present description emphasizes algorithms and features forming part of, or cooperating more directly with the method and hardware of the presently disclosed invention. General features of databases, digital communications devices, email and computerized systems are likewise well known, and the present description is generally limited to those aspects directly related to the method and related hardware of the invention. Other aspects of such algorithms and apparatus, and hardware and/or software for producing and otherwise processing the data involved therewith, not specifically shown or described herein may be selected from such systems, algorithms, components, and elements known in the art.

Figure 3:
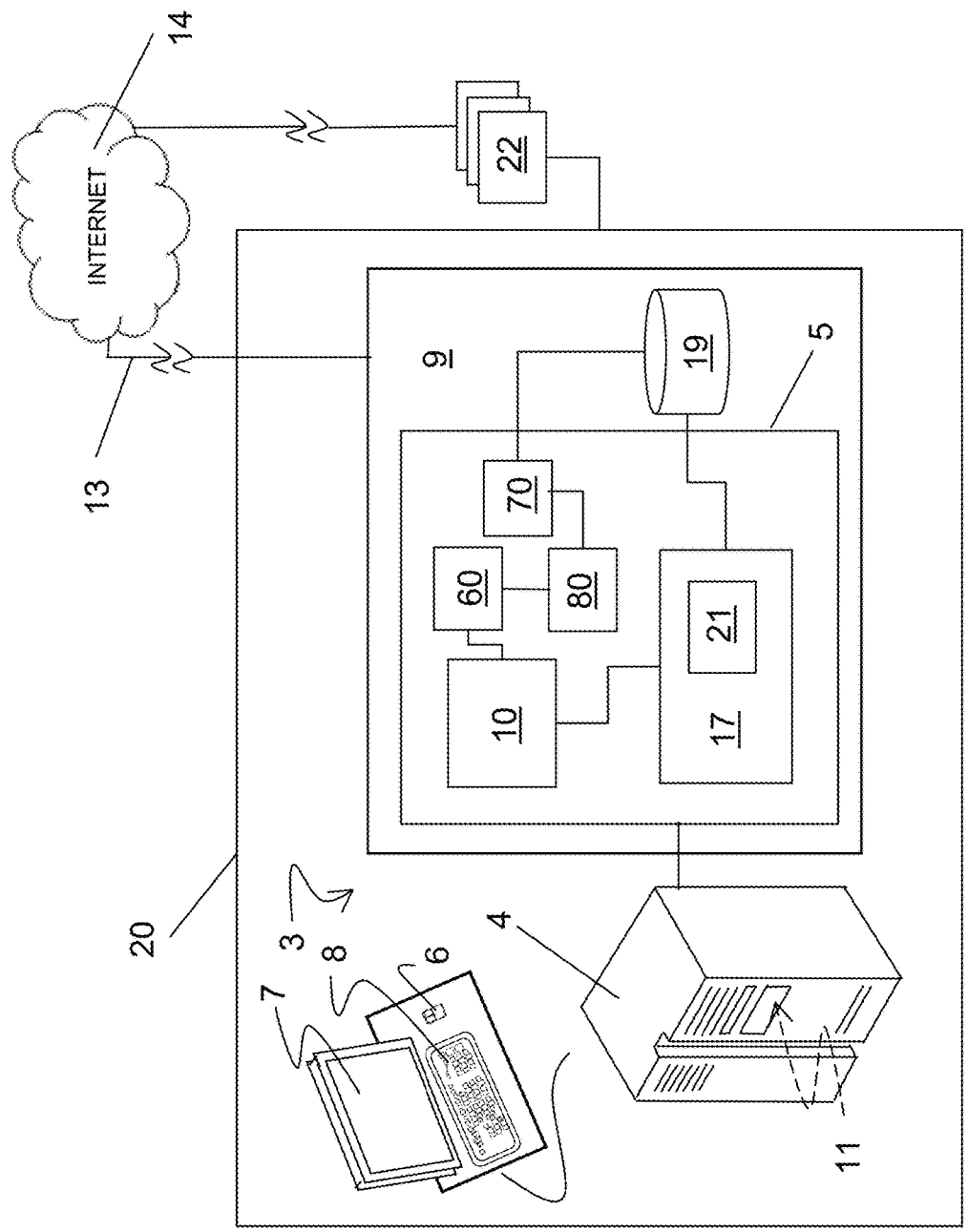
FIG. 3 is a diagrammatic presentation of an embodiment of a computer platform for the VTAS of the present invention.

The present invention can be implemented in computer hardware and computerized equipment. For example, the method can be performed using a system including one or more digital communications devices and/or one or more personal computer systems. Referring to FIG. 3, there is illustrated a computer system 3 for deploying the present invention. Although the computer system 3 is shown for the purpose of illustrating a preferred embodiment, the present invention is not limited to the computer system 3 shown, but may be used with any electronic processing system such as found in digital communications devices, cellular phones and other mobile devices, home computers, tablet computers, or any other system for the processing of digital data. The computer system 3 includes a server computer 4 having a microprocessor-based unit 5 (also referred to herein as a processor) for receiving and processing software programs and for performing other processing functions. An output device 7 such as a visual display is electrically connected to the microprocessor-based unit 5 for displaying user-related information associated with the software, e.g., by means of a graphical user interface. A keyboard 8 is also connected to the microprocessor-based unit 5 for permitting a user to input information to a software program. As an alternative to using the keyboard 8 for input, a mouse 6 may be used for moving a selector on the display 7 or alternatively a touch screen input device may be provided for selecting an item and operation of the software application.

The output device 7 provides visually to the user transactional data that has been subject to transformations. The output device 7 can be a monitor, a tablet computer, or other visual computer screen or graphical user interface (GUI) a printer or other output device that provides a visual or other representation of a final output from the microprocessor-based unit 5. The output device 7 can also be an output device that provides the transactional data as a digital file.

The microprocessor-based unit 5 provides means for processing the transactional data to produce readily discernible, informational and organized images and data on the intended output device or media. The present invention can be used with a variety of output devices that can include, but are not limited to, a digital photographic printer and soft copy display. Those skilled in the art will recognize that the present invention is not limited to just these mentioned data processing functions.

The server computer 4 shown in FIG. 3 can store a computer program product having a program stored in the computer readable storage medium 11, which may include, for example: magnetic storage media such as a magnetic disk or magnetic tape; optical storage media such as an optical disc, optical tape, or machine readable bar code; solid state electronic storage devices such as random access memory (RAM), read only memory (ROM) or flash memory data storage devices. The associated computer program may be stored locally and or remotely on a virtual machine (VM) or data center using any other physical device or medium employed to store a computer program indicated by offline memory device.

It should also be noted that the present invention can be implemented in a combination of software and/or hardware and is not limited to devices which are physically connected and/or located within the same physical location. One or more of the devices illustrated in FIG. 3 can be located remotely and can be connected via a network connection 13. One or more of the devices can be connected wirelessly, such as by a radio-frequency link, either directly or via a network connection 13. It is to be appreciated that such devices can be mobile devices (e.g., camera, PDA, MP3 players, iPod, iPad, tablet computer, smart phone, or cell phone that can be used as a processing unit, a display unit, or a unit to give processing instructions), and as a service offered via the World Wide Web 14.

In each context, the invention may stand alone or may be a component of a larger system solution. Furthermore, human interfaces, e.g., the input, the digital processing, the display to a user (if needed), the input of user requests or processing instructions (if needed), the output, can each be on the same or different devices and physical locations, and communication between the devices and locations can be via public or private network connections, or media based communication. Where consistent with the foregoing disclosure of the present invention, the method of the invention can be fully automatic, may have user input (be fully or partially manual), may have user or operator review to accept/reject the result, or may be assisted by data or metadata (data or metadata that may be user supplied, supplied by another computer program or database from a different application or determined by an algorithm). Moreover, the algorithm(s) may interface with a variety of workflow user interface schemes.

In the following description, some features are described as "software" or "software programs". Those skilled in the art will recognize that the equivalent of such software can also be readily constructed in hardware. Because data manipulation algorithms and systems are well known, the present description emphasizes algorithms and features forming part of, or cooperating more directly with the method and hardware of the presently disclosed invention. General features of databases, digital communications devices, email and computerized systems are likewise well known, and the present description is generally limited to those aspects directly related to the method and related to the implementation of the software on computer system, electronic and communication system hardware of the invention. Implementation of the present invention may be in conjunction with one or more database management systems (DBMS) such as Oracle, IBM DB2, Microsoft SQL Server, PostageSQL, MySQL, or others using widely supported database languages such as SQL to define and manipulate data and perform data queries. Other aspects of such algorithms and apparatus, and hardware and/or software for producing and otherwise processing the data involved therewith, not specifically shown or described herein may be selected from any such systems, algorithms, components, and elements known in the art. The present invention may further be implemented on a secure web server 9 or secure remote data center using SSL, SHTTP or other security protocols for encryption and decryption of transmitted data. Data replication and redundancy is performed automatically and all servers are secured in optimal conditions. Further security is provided where each linguistic analysis project is setup using a unique domain name that is active solely during the period of analysis, and may be immediately deactivated upon project completion. At project completion, the entire database with all data may be ported to a storage unit and provided to the company as a secure record of all processing steps, communications and transactional data of the VTAS project. Secure management of the company's property protects it from unauthorized access while obtaining the widest possible input regarding development of alternative language.

The Vital Text Analytics system (VTAS) 20 of the present invention enhances the comprehension of requirements, specifications and other documents and may be implemented through application software 17 and as a web-native software application delivery model or SaaS (Software as a Service) to be hosted and operated as an on demand computing service such as a cloud or shared resource database through a web browser. The software includes policies and protocols in cloud description language (CDL) and domain specific languages (DSL) for this implementation to manage and monitor secure access and system usage to one or more data centers to provide multiple virtual servers with each server serving one or more instantiations of the VTAS operations. The implementation may further provide synchronization of local and remote desktop clients using virtual machine VM check in and check out operations to maintain access to the most recently updated local or remote copies that reflect user changes to accessed data files.

Figure 4:
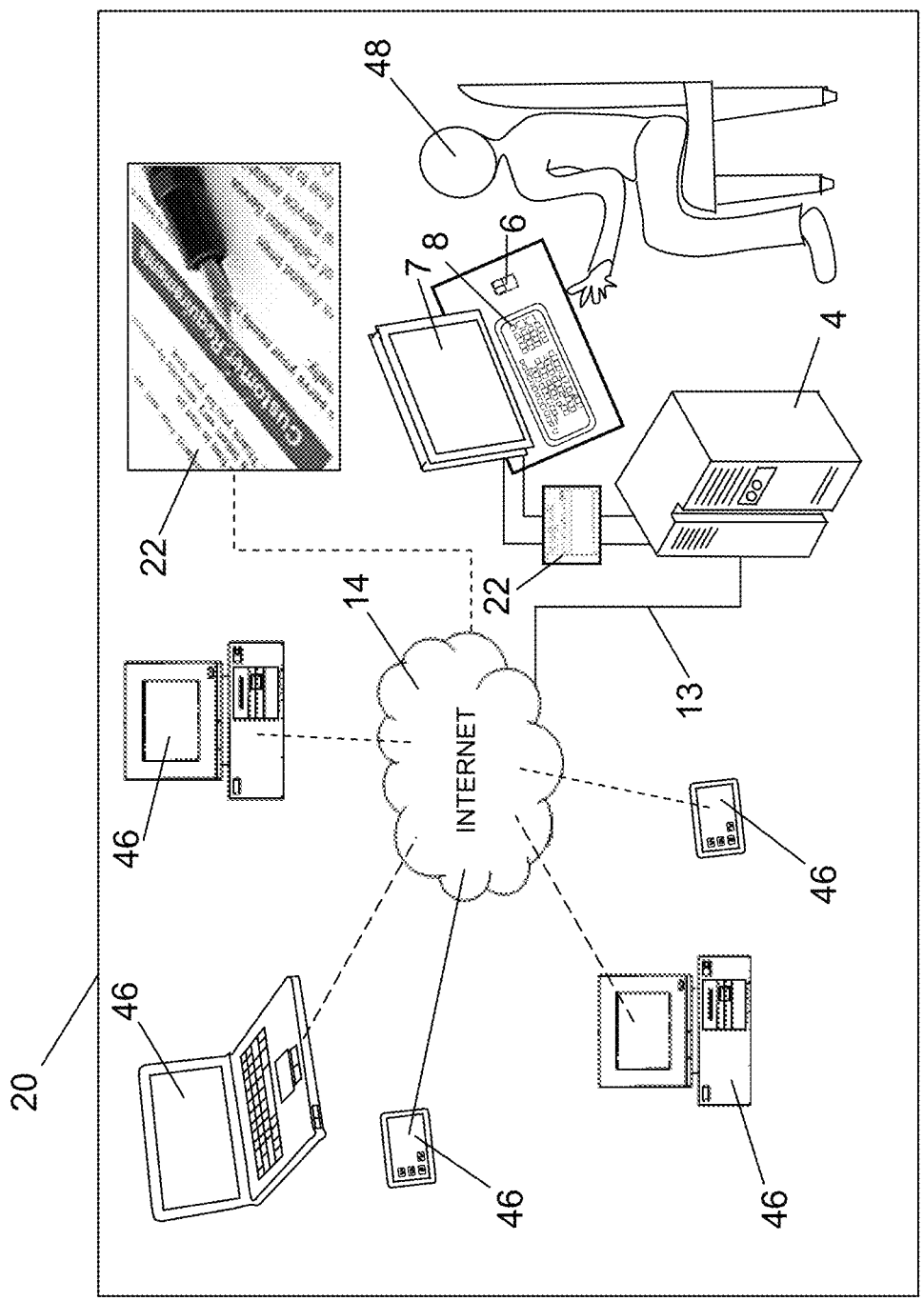
FIG. 4 is a diagrammatic presentation of an embodiment of a computer network for the VTAS of the present invention.

A secure login with password is provided to access the VTAS 20 locally or remotely with one or more users given privileges to modify, monitor and/or review the language enhancement process. Users of the VTAS 20, as shown in FIG. 4 may be business analysts, system analysts or requirements engineers 46 that interview stakeholders to author and develop requirements and engineering specifications and documents, data analysts 48 that are internal or external to a company and are performing the review and analysis of the company specified requirements documents using the VTAS 20, users 46 who are working with a company to develop, manufacture, train, operate or support a software or hardware technology product described within the requirements documents. Each user 46 is granted appropriate access to the secure project specific domain 9 through an administrator using administrative tools 21 to control the levels of access so as to prevent or limit access to the VTAS 20 through pre-defined privileges based on responsibility and expertise.

In a first embodiment, as shown in FIG. 4, one or more formatted or unformatted requirements document(s) 22 are downloaded to the VTAS 20 through an internet 14 or intranet network connection 13. The input documents 22 comprise for example statements exemplifying concepts, data, instructional information, regulatory information, requirements database elements and/or other requirements associated with a company's desired design or process outcomes. A company may be a business entity, a government entity, an individual or a group of individuals that are stakeholders in the desired design outcome. Administrators and data analysts 48 may be internal and/or external to the company. The documents 22 are then stored in, for example, a Vital Text Repository 19 for processing. A secure web domain 9 is modeled and configured based on information from the requirement documents 22 and a unique project name is given to the domain. Each document 22 is given a unique file name for processing and identification that includes source information, the project name, the date, a time stamp and a revision number.

Figure 5:
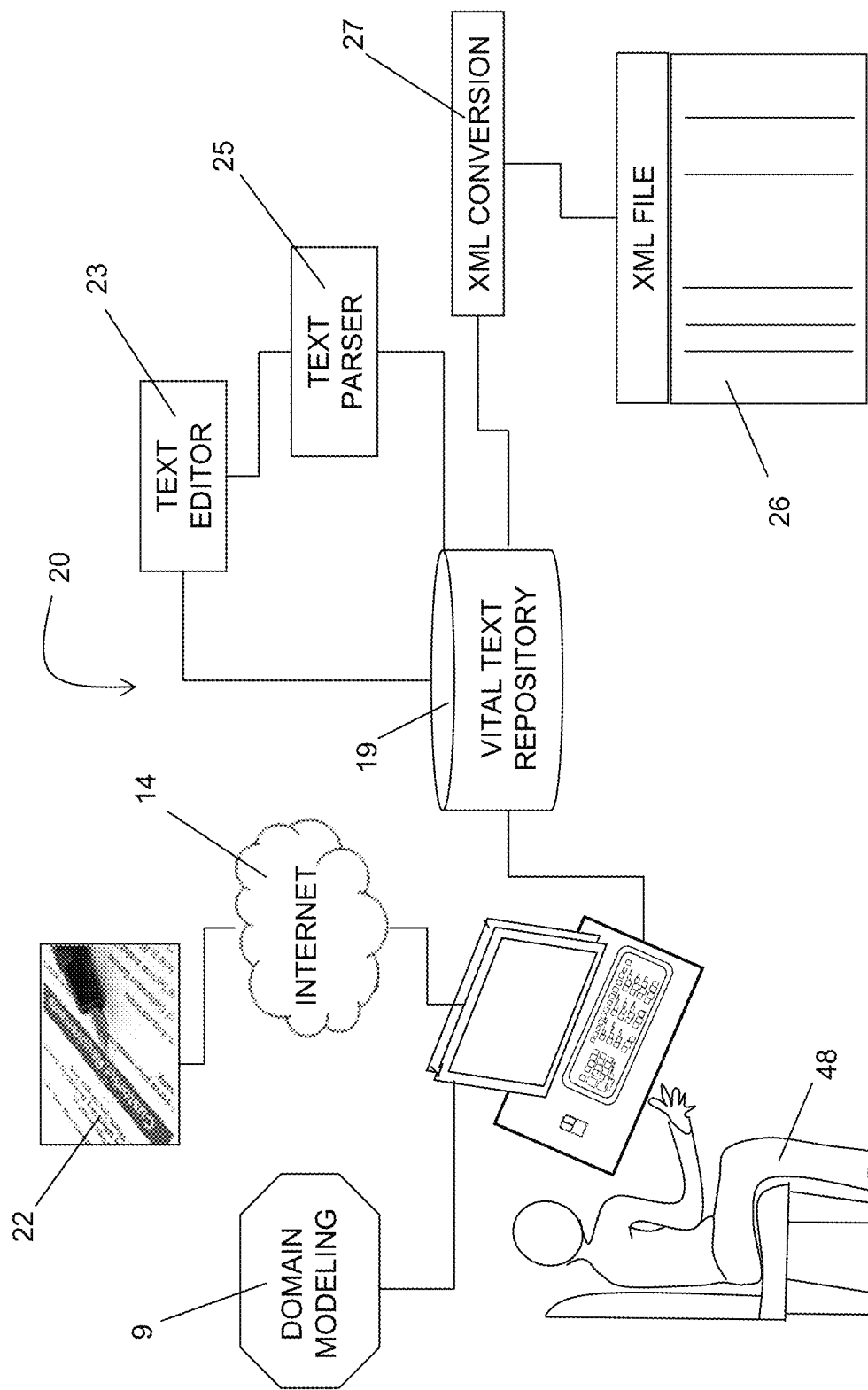
FIG. 5 is diagrammatic presentation of an embodiment of some of the initial processing steps for analysis of one or more requirements documents in a first embodiment of the present invention.

Using the VTAS 20, the document(s) 22 are first modified by spell, grammar and other standard quality tools 23 to correct spelling, grammar, and other basic faults identified by common automated methods as shown in FIG. 5. Terms or concepts and the remaining text is tagged for analysis and stored in the Vital Text Repository 19 for further processing. A text parser 25 performs preliminary low-level parsing algorithms to recognize and tag various structural features of documents that are related to document organization (e.g., headings, paragraph numbers, graphical marks such as horizontal rules). Using the VTAS 20, the document(s) 22 are converted to a machine readable format 27, such as XML, to encode and serialize the data to undergo Natural Language Processing (NLP) 24 using one or more linguistic analysis tools.

Automated processing in this stage employs a collection of linguistic and cognitively oriented tools to develop the Vital Text Computation Object (VTCO) 34. For example, through the Vital Text Sentence Model (VTSM) 28 one or more available linguistics data services may be used to guide analysis and tagging through a wide range of analyses and tagging tools for identifying the Parts of Speech (POS) and for annotating the morphemes, words and larger structures of the text with further document-specific and domain-specific information that serves as critical input to later stages of the VTAS 20 process. A collocation analysis that finds word pairs or phrases that occur unusually often, as determined statistically, are also identified and tagged or logged. Terms that are unique to the sponsoring corporate or organizational entity may also be identified and tagged in the XML formatted file. Through a lemmatization process, variant word forms that represent different manifestations of a common core of semantic or functional content are also tagged. For example, the word 'walk' has variant forms such as 'walks', 'walked', and 'walking', all of which invoke the same core semantic content. An N-gram analysis may also be performed to identify a contiguous sequence of n items from a given sequence of text or speech. The items can be phonemes, syllables, letters, or words according to the VTSM process. One of the most important analyses at this stage addresses the syntactic structure of the text. Drawing upon a variety of parsing algorithms, one or more syntactic tree structures are constructed for each sentence (or candidate sentence) and the probable adequacy of each structure is estimated. One or more algorithms for Named Entity Recognition are also applied to tag expressions that may have special or unique value in the text. Further lexical and syntactic analyses are applied to detect and tag words and structures that are potentially involved in anaphoric relations across sentences. There are also algorithms that seek out and tag points within sentences where different candidate ontologies for the text as a whole may be particularly consequential for syntactic, semantic or pragmatic analysis of the individual sentence.

Figure 6:
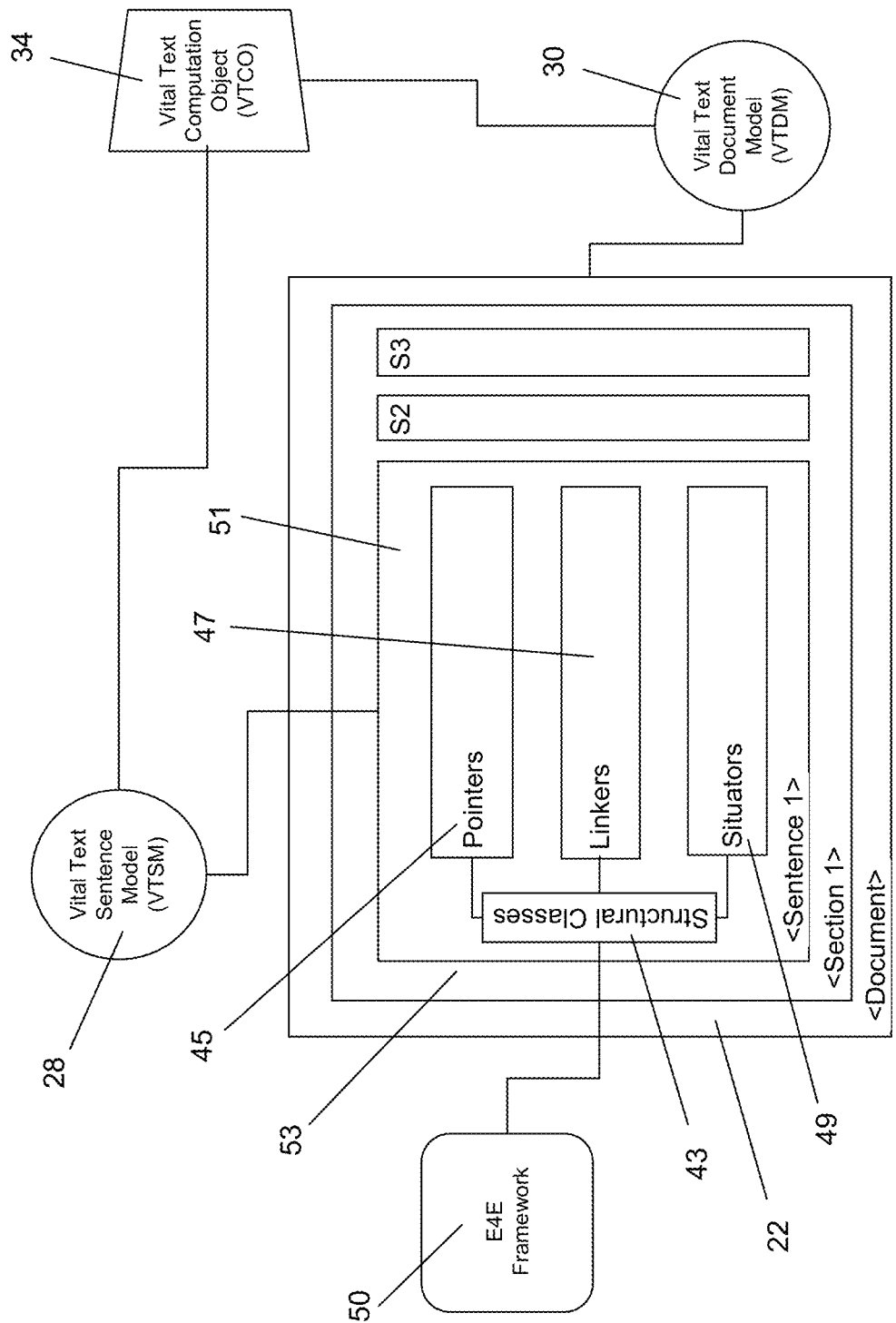
FIG. 6 is a block diagram of the structural classes based on the E4E framework identified through VTSM process and the VTDM process to develop the VTCO in an embodiment of the VTAS of the present invention.

As shown in FIG. 6, further analysis is performed by applying the VTSM 28 and VTDM 30 derived from the E4E framework 50. The VTSM 28 distinguishes three semantic/pragmatic functions pointers 45, linkers 47, situators 49 that must be addressed by even the simplest sentence. The art of sentence construction that the VTAS is designed to foster rests on how well each of these three functions is executed within a sentenced, given its context of occurrence. The classes of sentential substructures that invoke these functions (Structural Classes 43) constitute well-recognized distinct structural domains within sentences. The distinctiveness of the VTSM 28 consists not in discriminating the substructures associated with each of the three structural classes 43, but with the functional perspective taken toward the work that these elements do in the sentence. The non-standard terms applied to these three structural classes 43 are meant to highlight the functional role of the structures. This moves the focus away from the notion of a sentence as a pattern or layout of materials and toward a conception of the sentence as a tool that engages three quite specific (and quite remarkable) cognitive functions in the reader.

The E4E framework 50 is not a 'traditional pedagogical grammar' of English. Though the model in full does align relatively tightly at some points with most generative models of English syntax, it is not derived from any formal generative grammar of English. Rather, the E4E framework 50 approaches English from a consistently practical and intuitive perspective. It considers sentences in terms of putative cognitive functions that are readily apparent to linguistically naive speakers, but whose relation to sentence structures and other cognitive resources of humans is far from completely clear. In speaking of the functions as 'pointing', 'linking', and 'situating', each of these being associated with a structural class 43 referred to herein as pointers 45, linkers 47 and situators 49, respectively.

The VTAS 20 performs an analysis of each sentence by identifying the structural classes 43 and their implementation and relationships within a sentence 51. A sentence 51 must effectively indicate one to three entities (broadly conceived) that are accessible to the reader and should do so in a way that reflects the status of each entity relative to the current domain of the discourse as the reader sees it. This is done with pointers 45, structures that have nominals as their lexical core, generally known as Noun Phrases or Determiner Phrases. In the sentence, 'Transistors generate heat' the word 'transistor' is a generic reference that covers more or less everything that can be denoted by the nominal term 'transistor'. The sentence, 'A transistor is generating excess heat' indicates to the reader by use of the expression 'a transistor' that the entity at issue is a transistor, but not a particular one that is currently in focus in the discourse. The sentence 'The transistor generates excess heat' indicates by use of the expression 'the transistor' that a specific transistor is in question and that that transistor should already be identifiable for the reader on the basis of prior discourse context. Most especially, pointers 45 are not seen here as structures with direct relations to entities in the world, but only as tools for indicating entities within, or to be constructed in, the conceptual space of the reader at a given point in a sentence 51 in a text. The sentence 51 must indicate a 'scenario' that is specified by the verbal core (typically termed a Verb Phrase) of the sentence 51, a linker 47. The linker 47 intuitively and most typically indicates an event involving multiple entities, as in the sentence 51, 'The transformer damaged the circuit.' a relationship, as in 'The circuit resembled an amplifier.', or an event involving only one entity, as in 'The transistor failed.' The VTAS performs an analysis to identify each of the linkers 47 as logical forms suggested by these formulae: damage (transformer, circuit), resemble (circuit, amplifier), fail (transistor), i.e., as instances of a damage linker, a resemble linker, and a fail linker. Consistent with the functional approach to the sentence that characterizes the E4E framework 50, these formulae are seen as function-argument structures. That is, the linker 47 is seen as invoking a function that maps the arguments (invoked by the pointers 45) into a scenario of a kind determined by the linker 47 itself. Where there are multiple pointers 45 in a sentence 51, the morphosyntax of the sentence 51 indicates which pointer 45 is assigned to each role indicated by the linker 47. That is, the linker and its relation to its arguments plays a similar role to the other two functions (those associated with pointers 45 and situators 49) in that it indicates how the relevant entities are involved in the scenario indicated by the linker 47. It allows the writer and reader to distinguish 'The robot damaged the hoist' and 'The hoist damaged the robot.'

The sentence 51 must also situate the scenario in time, as the temporal context is conceived by the reader. The situator 49 or situators of a sentence 51 (e.g., tense; in technical terms, the sometimes complex material commonly linked with a Tense Phrase or Complementizer Phrase) transforms the abstract scenario indicated by the pointers 45 and linkers 47 into a claim about some specific event or situation in time (or out of time, depending on specifics of the structure). Both the pointers 45 and situators 49 of the sentence operate within the discourse domain defined by the reader's current conception of the 'world' invoked by the text.

Figure 7:
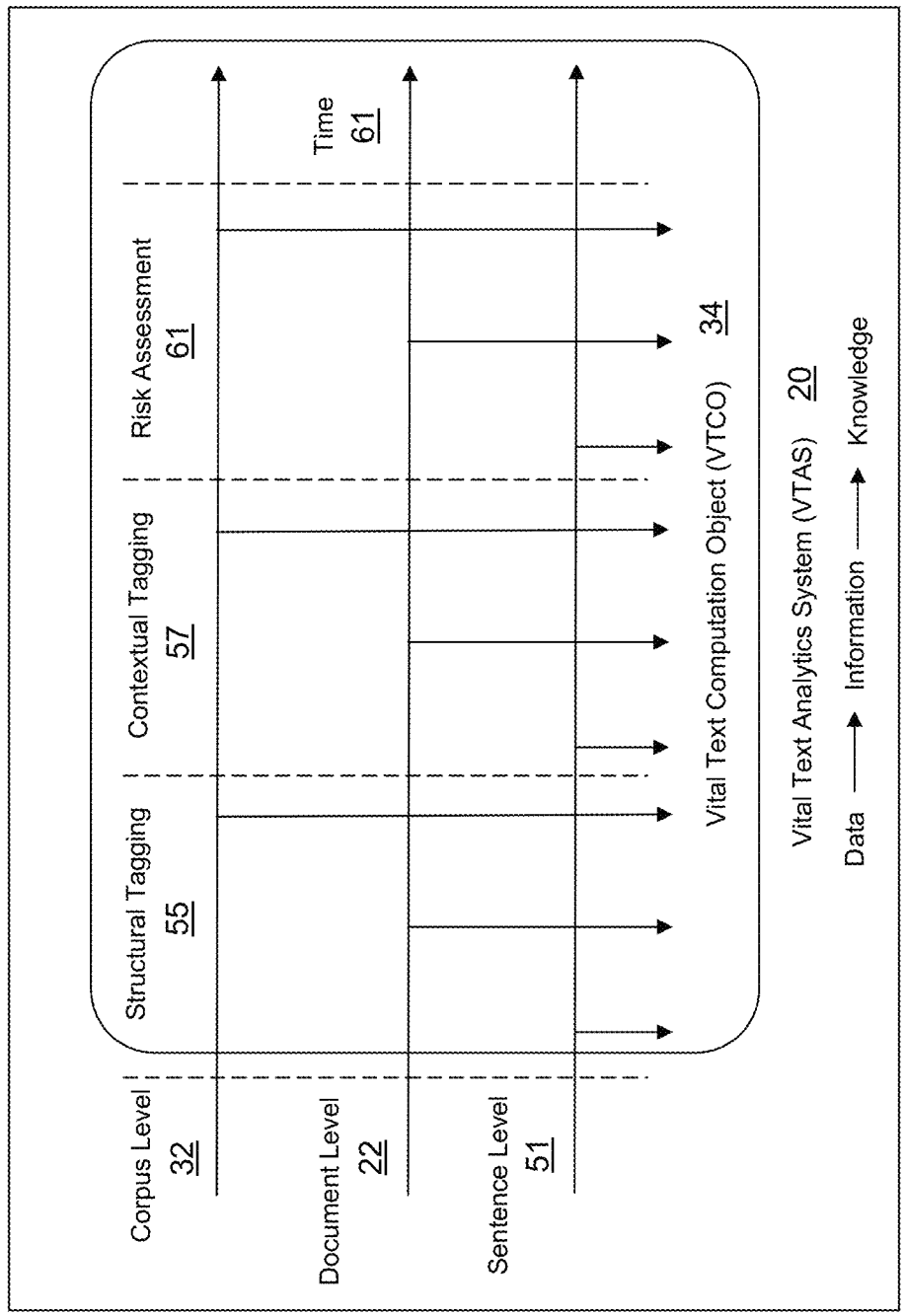
FIG. 7 is a diagrammatic representation of the levels of analysis in developing the VTCO in an embodiment of the VTAS of the present invention.

Each sentence 51 and section 53 of the document 22 is analyzed using the VTAS 20 to identify and tag all relevant material in each sentence in relation to the structural classes 43 as pointers 45, linkers 47 or situators 49. Any structure punctuated as a sentence 51 that fails to incorporate each of the structural classes 43 is identified and tagged for special handling using the VTSM 28 within the VTCO 34. Various interfaces to the VTCO 34 are able, through highlighting and mouse over effects, to present the identified classes 43 for each of the well-formed, complete sentences as an organized set of data that supports a progression from data to information and to knowledge on the part of analysts 48 and authors using the VTAS 20. The VTAS 20 integrates metadata at every level of analysis from the sentence 51, document 22, and corpus 32 levels as shown in FIG. 7 to structurally tag 55, and contextually tag 57 document content using the E4E framework 50. Analysis and tagging generally proceeds left to right in FIG. 7 such that the opportunities for contextual tagging 57 and analysis, and for risk assessment 61 are enhanced by the processes to the left of each of these phases of the VTAS process. The VTAS 20 develops and uses the rich body of metadata it incorporates into the surface form of the text to create a far more informative data structure that greatly facilitates detection and analysis of problems affecting the comprehensibility of the text from the perspective of the reader.

Much sentence complexity is treated in the VTAS 20 using the E4E framework 50 as deriving from two very general processes, subordination and coordination. This is primarily a pedagogical stratagem to facilitate communication with users, though it does also affect some aspects of tagging and other relevant processes. The emphasis is on showing that much of sentence complexity can be seen as deriving from these two very general and intelligible combinatory processes, each being manifest in many forms. Subordination is presented as a very general process of building structures by combining pairs of structural elements of different kinds in such a way that the newly formed structure is able to invoke a function different than that of either constituent. For example, a Prepositional Phrase (e.g., 'beside the altimeter') is presented as invoking modification a function that neither 'beside' nor 'the altimeter' can invoke, but where the preposition 'beside' is the privileged constituent that determines the functional role of the combined structure. Coordination is presented as an alternative mode of sentence elaboration which is characterized by leaving the functional role of the coordinated structures untouched and giving them essentially equal roles in the combined structure. For example, in the sentence 51, 'The follower arm must respond rapidly and reliably.'; the adverbs 'rapidly' and 'reliably' play identical functional roles relative to the verb linker 47 'respond', and neither is in any sense privileged relative to the other. A pedagogical advantage of the E4E sentence model (given its focus on the three core functions implemented by the three structural classes 43) is that it readily extends to some kinds of coordination that can be quite puzzling when considered in purely structural terms. For example, in the sentence, 'The helical gear was a critical component and essential to the control of pitch' the coordinated structures are 'a critical component' and 'essential to the control of pitch', which are of different syntactic forms, the first being a Noun Phrase 45 and the second an Adjective Phrase. Commonplace descriptions of coordination suggest that such a coordinate structure is impossible. Nevertheless, the two disparate structure types that are coordinated in this instance work because each makes the same kind of functional contribution to the sentence within which the coordinate structure sits.

The E4E framework 50, again largely for pedagogical reasons, approaches lexical and morphological issues in such a way as to stress the simplicity and consistency of English processes to the extent possible. With that goal in mind, lexical and morphological issues are treated as providing a surface layer to a sentence 51 that often adds a very specific flavor and texture reflecting the particular words and forms chosen, but that also is very strongly shaped by and integral with relatively simple and consistent core principles reflected in the VTSM 28 and VTDM 30. The emphasis is on showing how the most regular and consistent forms in the language allow for the realization of the three core sentence functions related to the three structural classes 43 of the E4E framework 50 sentence model. The irregularity characteristic of many of the most common words in the lexicon is, wherever possible, positioned as a distortion of regular processes and patterns in the language. The focus is on distinguishing the systematic core of the language from the many relatively superficial eccentricities that arise, especially in relation to the lexicon. The ultimate aim is to make it easier to explain to an author what the issues are with a text and how those issues can be most effectively addressed.

The VTAS 20, consistent with the E4E framework 50, and like many other approaches to discourse, is designed to approach a text 22 as a sequence of sentences that ideally will incrementally guide the reader from some initial understanding and perspective on the topic at hand to an understanding and perspective the author has in mind. The reader's process of incrementally interpreting text is complex in that it involves questions of the (possibly disparate) goals of the author and reader, the problem of determining what set of referents are in view (for the reader) sentence by sentence over the text, the role of background knowledge, assumptions that may or may not be shared by author and reader, and a variety of other matters. All of these issues can vary across relevant subgroups of a document's intended readers. Since the sequence of sentences in technical writing is typically composed entirely of assertions, some complexities are avoided (especially with respect to situators 49). But those technical documents that are written on the assumption that some or all of their subparts can be read in isolation, without regard to any ordering of those subparts relative to each other, raise other sorts of difficulties that distinguish them from typical linear texts. Specifically, while the VTSM 28 applies readily to single sentences or within small blocks of text, other issues arise as to how the reader's background knowledge and current viewpoint are to be assessed. The E4E framework 50 provides a coherent and consistent framework for addressing all of these matters with authors.

In processing a document through a sentence by sentence analysis, the VTAS 20 software will tag each word with an appropriate part of speech (POS) identifier, introduce lemma information for each word, estimate one or more possible syntactic parses for the sentence, and conduct a variety of other preliminary analyses, that will tag each word with an appropriate part of speech with the results of which will be encoded in tagging added to the VTCO 34. Importantly, the VTAS 20 process focuses on three major cognitive functions (defined within the E4E framework 50) that are invoked by sentences. This central focus of the sentence analysis process is the identification and tagging of those structural features of the sentence that bear on those three functions. All such tags are added to the VTCO 34.

Using the VTSM 28 process, the VTAS software will perform an initial scan to identify and tag the structural manifestations of pointers 45 (generally, Noun/Determiner Phrases) within a sentence is performed using VTSM 28 processing features of the VTAS 20. In the example sentence, 'The admin widget will manage new users and requirements.', the VTAS 20 software identifies 'the admin widget' and 'new users and requirements' and tags these as the primary pointers in the sentence. The VTAS 20 then using a number of components, modules and resources steps through a series of process steps to; a) assess the definiteness of these structures, b) distinguish 'widget' as the head of the first pointer, c) recognize the coordinate structure of the second pointer, d) estimate whether the adjective 'new' is intended to modify both 'users' and 'requirements', or only the first of these, e) assess the relation between the verb and the terms 'users' and 'requirements', as well as the similarities and differences between the latter two nouns, to estimate (among other things), which sense of 'user' is relevant here (a person that might be managed by another person, or a person as recognized by a software system managing user login accounts), among other things.

In a next processing step, VTAS software 20 identifies a linker 47 (i.e., the matrix verb) and recovers relevant information about that verb, especially the thematic roles it assigns, or may assign in relation to different senses. Then the VTAS software estimates on the basis of the syntactic structure of the sentence (or an estimate of it, if the structure does not appear to be well-formed) how these roles are to be assigned in this specific case. Tagging associated with this phase of the process is mostly driven by the need to highlight and articulate the role of the matrix verb in the VTI of any issues related to the present sentence. The VTAS software 20 then identifies and tags situators 49 (e.g., auxiliary or modal verbs, tense marking, negation). In the present example the software must recognize and tag the auxiliary verb 'will' and recognize its ambiguity as to whether it is meant to invoke an epistemic sense (re: time) or a deontic sense (e.g., of a command). The results of the linker and situator tagging are added to the VTCO 34.

From the structural class indicators and tagging of the cognitive functional parts of the sentence 51, the VTAS 20 software forms sets of terms that support an ontology of the sentence, and, in many cases, also support distinct alternate ontologies that can be the source of types of miscommunication that are identifiable as risks within the scope of the present invention. In the example sentence, the VTAS 20 software analysis identifies that the main subject of the sentence is a special type of 'widget' called the 'admin widget.' The structural class tagging further indicates a functional relationship between this widget and the conceptual objects 'users' and 'requirements,' described by the verb 'manage.' The situators tagged within the VTCO 34 indicate that the sentence is set in the generic future.

Many aspects of this sentence's ontology require access to a context extrinsic to the sentence to assist in determining context and meaning. Using the VTDM processing, a search and comparative analysis within the document on use of the same pointer 'admin widget' or on other pointers may be performed to provide additional aspects of the meaning or possible meanings of the pointer and the use of the pointer within the sentence. For instance, to what extent is 'widget' a generic term used to refer to many user interface components within the software described in the document and further, is the 'admin widget' itself a unique element or one of a class of 'admin widgets.' Additionally, are 'users' and 'requirements' usually associated with generic 'widgets' or exclusively with 'admin widgets.' All uses of the pointer would be identified, tagged and accessible for further analysis within the VTCO 34.

In cases where supporting material is available, the VTDM 30 analysis process may extend beyond all of the present document using the Corpus Model 32 processing software to a comparative analysis a corpus of other similar documents to determine the probabilities of how 'widgets' are associated with 'users' and 'requirements' within a certain type of software as well as the prevalence of 'admin widgets' vs. generic 'widgets.'

Additional searching would be automatically performed to identify uses of the term 'admin widget' within an explicated ontological library for the company containing the present document and/or for the industry. Alternatively, searches may be performed for the constituent terms 'admin' and 'widget' within the Vital Text Concept Library (VTCL) 90 of explications, where the present context can then be compared to that described through explications in the library entries. If the company associated with the document has an ontological library that does not yet include 'admin widget,' the term can be added during the VTAS 20 process and serve as a resource for future documents within a given scope.

Each statistical observation of use identified through these process steps in the document or corpus levels are translated into scores or weightings associated with each element of the sentence 51. These quantitative scales are used later in the VTAS 20 process to assess the degree of risk associated with any potential risk element within the text.

Once the VTAS 20 software has identified the components of the sentence and applied quantitative values to a comparative analysis based on the context within the present document and within any larger corpora beyond the present document's scope, the VTAS 20 software using the Risk Detector (RD) 38 applies Risk Patterns 63 to identify Risk Elements 65 within the text. In the present example, the VTAS 20 software the modification of 'widget' by 'admin' may be identified as a Risk Element 65 requiring further analysis, if these terms were not commonly used within the document 22 or document corpus. The context extrinsic to the present sentence acquired through the VTDM 30 and Corpus Model 32 provides the analysis to determine whether there are multiple different components within the document or a particular type of software that are referred to as 'admin widgets.'

A further potential ambiguity concerning the coordination by the 'and' of the 'new users' and the 'requirements' is evaluated through the VTAS process to determine if the 'admin widget' manages 'new users' and 'new requirements,' or 'new users' and all 'requirements.' The VTAS 20 uses the E4E sentence and document models to then assess the risk of confusion to the eventual reader of the document raised, for instance, by these two Risk Patterns 63. As well, because the sentence model defines the relationship between these two types of 'pointers' in the sentence, the subject (the 'widget') and the objects (the 'users' and 'requirements'), the VTAS 20 software can assess the risks of the two Risk Patterns 63 in combination. Using this method, the VTAS 20 software determines if the term 'admin widget' is unambiguous in the present sentence because, a) the entire requirement is about this singular 'admin widget,' or b) within the company's corpus of documents (or type of software they describe) the term 'admin widget' is well understood and has not been associated with errors in the software testing process. On the other hand, this process may also determines if the term 'admin widget' is ambiguous in the present sentence because, a) within either the present document or corpus of documents there are many different entities referred to as 'admin widgets,' or b) the use of 'admin widget' in the present sentence is different than in the document as a whole or in the corpus as a whole.

In terms of the assignment of the modifier 'new' to 'users' and 'requirements,' the VTAS 20 software through the VTDM 30 and Corpus Model 32 processes can look for evidence to support alternate scenarios: first, this widget allows a user to manage (i.e., create) new users and new requirements from the same interface; second, this widget allows a user to create a new user and assign that user to existing requirements; or three, this widget allows a user to create a new user and assign that user to existing requirements or to create a new requirement to assign the new user to. The Risk Assessors (RA) 39 of the VTAS 20 use the contextual document-level and corpus-level information to determine the likelihood of each of these scenarios and identify a level of risk associated with the match of the Risk Element 65 to the Risk Pattern 63.

For instance, if almost all examples of the term 'admin widget' in the document or corpus are adjacent to both terms 'new user' and 'new requirement,' it might be highly likely that the 'new' refers to both objects in the present sentence. If, on the other hand, many instances of 'admin widget' are not collocated with references to 'users' and 'requirements' at all, the VTAS 20 software may accumulate information that shows there are many types of 'admin interfaces' in the scope of the present document or corpus and determine that the use of the term in this sentence context is vague if not actually confusing. Additionally, this process would also identify the future tense of the situator to be generic to most software requirement documents and to not be a cause of concern or confusion in the present context.

The ability to understand which terms are used in a manner congruent with the common practice of a target population of readers is crucial to creating helpful tools to improve the fidelity of written technical documents. If, in the present example, 'admin widget' is the entire subject of the present document or is used with a high level of consistency in the enclosing corpus, it would be pedantic to alert the user to a potential risk that in fact poses almost no risk. Part of the scope of the present invention is the injection of an understanding of how user experience impacts the actual utility of these sorts of analysis systems. Every item in a document identified for the user to consider spends their attention and may leave them inattentive to a more important issue farther on in the text.

One of the important objectives of the present invention is to not only identify potential Risk Elements 65 within a text, but to only identify the risk that are truly problematic in the present context. However, the VTAS 20 stores all identified Risk Elements 65 for future analysis as needed. Further, for the Risk Elements 65 called out for consideration, the VTAS 20 offers forms of input that allow the user to remedy the risk potential and thereby improve the VTQI 120 for the document and for themselves as an author. For instance, in the present example, if it is determined that the term 'admin widget' exists in many forms in the present document or larger corpus, the VTAS 20 would provide through the Vital Text Interface (VTI) suggestions for adding a further modifier to the term to make it clear that the sentence is referring to the 'admin new widget.' This addition would also have the additional impact of clarifying the potential ambiguity of the 'one and one' pattern identified with 'users' and 'requirements.' This one correction could potentially neutralize two identified risk potentials where the VTAS software can assess that a reader would be highly likely to understand that the 'admin new widget' allowed a user to manage both 'new users' and 'new requirements.'

It is a further important aspect of the present invention that as such Risk Elements 65 are identified for the author or user, contextual content from the E4E curriculum 99 is made available that helps the author understand the nature of the particular risk of miscommunication and how to avoid it in the future. In this way, the VTAS 20 system is able to turn each potential mistake into a positive teaching moment. The author gets the satisfaction of fixing the present document, improving their skills and understanding as a writer, and also raising the VTQI score and with it their value to their company.

Figure 8:
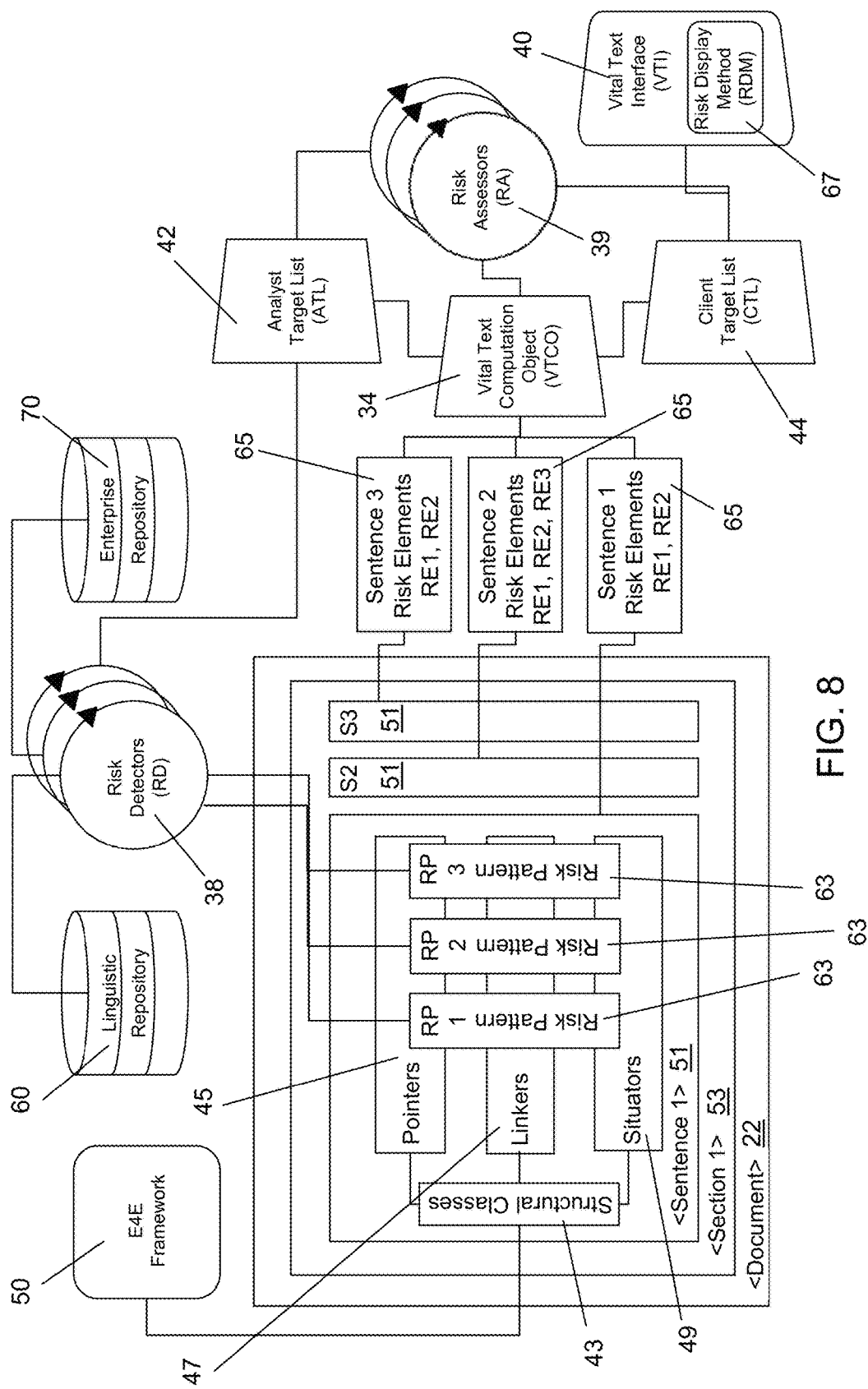
FIG. 8 is a block diagram of the structural classes based on the E4E framework identified through VTSM process and the VTDM process and the Risk Detector (RD) and Risk Assessor (RA) processes to annotate the VTCO in an embodiment of the VTAS of the present invention.

The tagging of terms and structures provided by the VTAS 20 using the E4E framework 50 make explicit a great deal of information about how the structural classes 43 realize the three core cognitive functions in each sentence across a text. This enables the Risk Detectors 38 to apply known Risk Patterns 63 to the sentences 51 in a text 22 in order to identify Risk Elements 65 that contribute to potential sources of misunderstanding within the text. As shown in FIG. 8, the Risk Detectors (RD) 38 are algorithms that scan the tagged text in the VTCO in search of a diverse range of structural features that may be relevant to the Risk Pattern 63 that each Risk Detector (RD) is responsible for, these being patterns or relationships have been found to be common sources of misunderstanding or confusion. Individual Risk Detectors (RD) 38 may target small and highly constrained structures (even single words for some Risk Detectors) or larger and more complex structures that could be bounded by a single sentence 51, or even target structures and relations that span multiple sentences 51 at widely separate locations within sections 53 or within the text as a whole.

The Risk Patterns 63 may be known and be taken from a Linguistic Repository 60 within the VTAS 20. These general Risk Patterns 63 are usually expressed as syntactical structures and are generally defined over POS categories, but they may in some instances include specific lexical items. For example, a general Risk Pattern 63 may be in the form of a structure such as 'MODIFIER WORD1 CONJUNCTION WORD2' of which the more specific pattern ADJECTIVE NOUN and NOUN is an example. The noun phrase 'damaged capacitors and resistors' would be an instance of the general pattern and the more specific variant, and one that exhibits an ambiguity characteristic of these structures in that it is unclear whether the writer intends to indicate that both the capacitors and the resistors are damaged. Further specific Risk Patterns 63 may be derived from analysis of the Enterprise Repository 70 where specific terms used in the corporate ontology appear. Risk Elements 65 identified from these Risk Patterns 63 may be given a higher or lower ranking in particular texts on the basis of analysis possible interactions among Risk Patterns 63 detected in an analysis of the Enterprise repository 70. In many instances Risk Patterns 63 may be patterns that arise wholly within single linkers 47 situators 49 or pointers 45, but they are not limited to such cases.

Further risk detection may be performed from lists of commonly known terms that have been identified as being ambiguous or that support many types of ambiguity. These terms may be stored in the Linguistic Repository 60 and the Risk Detectors (RD) 38 may perform a series comparative analysis using these terms and/or other constructs identified as risks correlated based on a set of compiled grammatical or syntactic rules from an analysis of technologies within an industry, and from a variety of document risk types within that technology. This analysis may include identified ambiguous terms such as "user-friendly" or any such representation of this term, "easy", "simple", "rapid", "efficient", "maximize", "minimize", "improve", "state-of-the-art" or any such representation of this term or any modal verb such as "may", "can", "could", "must", "will", "shall", "most" or other terms that are known to lead to confusion.

The results of this analysis are stored in the VTCO 34 with any identified salient term noted as a Risk Element 65 indicating a possible ambiguity.

The Risk Detectors (RD) 38 perform a potentially highly iterative, process whereby the VTCO 34 including annotations related to structural classes 43, is analyzed by a number of specific functions to apply these Risk Patterns 63 and identify specific instances of Risk Elements 65 at the document, sentence and text levels. Collectively, the Risk Elements 65 are returned in the Analyst Target List (ATL) 42 that identifies specific suspect items or structures at specific locations in the text and links each to one or more specific potential issues for consideration by a Data Analyst 48. The ATL 42 may be constructed at various levels of analysis and may therefore be amended to remove potential defects that have been judged trivial in the earlier phases of the process steps. Using the Risk Assessors (RA) 39, those discovered Risk Elements 65 are assessed for the likelihood an error of interpretation will occur and for the severity or consequence of any such error. For instance, a Risk Detector applying a simple Risk Pattern 63 that identifies all instances of 'it' in the text could also contain (or be succeeded by) a Risk Assessment 39 that downgraded instances where the 'it' only has a single potential antecedent within relevantly close context and which therefore presents no great potential for generating ambiguity or confusion. The results of this assessment are added to the VTCO 34 as a name-spaced layer contributing to the Analyst Target List (ATL) 42.

The Risk Elements 65 identified in the ATL 42 are tested or scored against tolerances for each risk type. The term 'risk' is used loosely and broadly, meaning that any feature of the document 22 that potentially threatens the quality, reliability, functionality, suitability-to-task, or cost of the finished system a requirements document is meant to describe may be considered a risk. Often these 'risks' are features of the document 22 that allow for, or even invite, misinterpretation, or that create conflict or confusion in relation to other elements of the document, or that tacitly invoke unstated assumptions. Rarely will these be 'risks' in the ordinary sense of grammar checkers in which, for example, 'they're', 'there' and 'their' are frequently substituted for each other. Scoring of the kinds of risks targeted here is accomplished through some combination of automation (i.e., additional functions and machine learning) and human judgment, also including intervention by data analysts 48 possessing appropriate domain knowledge and expertise. This process, as with the risk detection process, can be highly iterative or involve the input of multiple analysts and different domain experts to assure that only significant Risk Elements 65 are retained for the final analysis.

The Risk Elements 65, deemed to be of sufficient severity, are output to a Client Target List (CTL) 44 which identifies specific Risk Elements 65, risk types and locations within the text. The results of this step are added to the tagging in the VTCO 34 as a name-spaced layer indicating client level Risk Elements 65. Each distinct risk type has a corresponding Risk Display Method (RDM) 67 that is instrumented in the Vital Text Interface (VTI) 40 within a clean electronic copy of the original text as high-lit, color-coded and linked words or runs of text that target panels or other user interface devices to display an explication of the specific Risk Element 65, an explication of the risk type and a range of means for resolving the defect, and (where relevant) all Risk Elements 65 of a similar type in the document or section. Changes within the input mechanisms in these display devices immediately produce changes in the visible text of the document.

Figure 9:
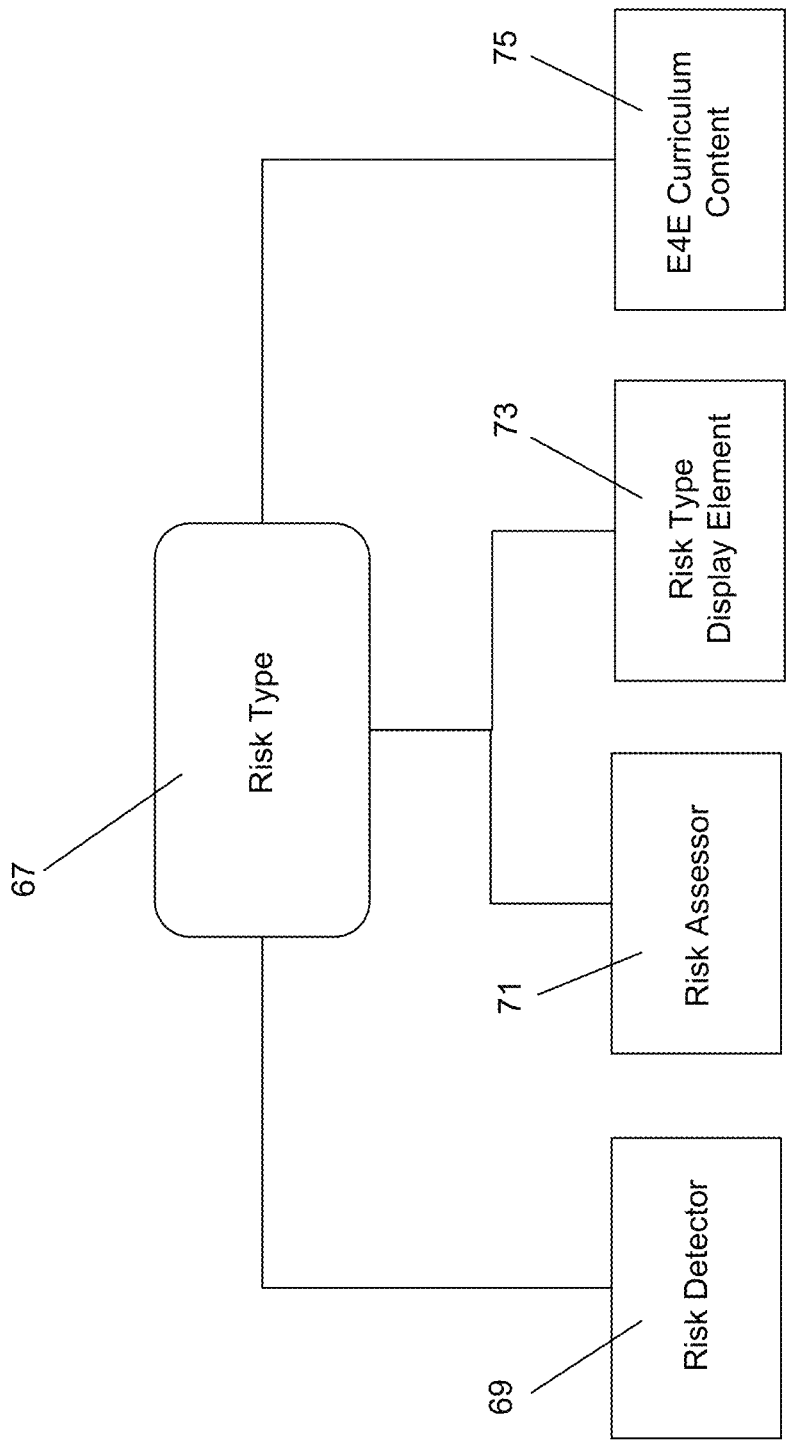
FIG. 9 is a block diagram of some of the factors of the Risk Display Method (RDM) in an embodiment of the VTAS of the present invention.
Figure 10:
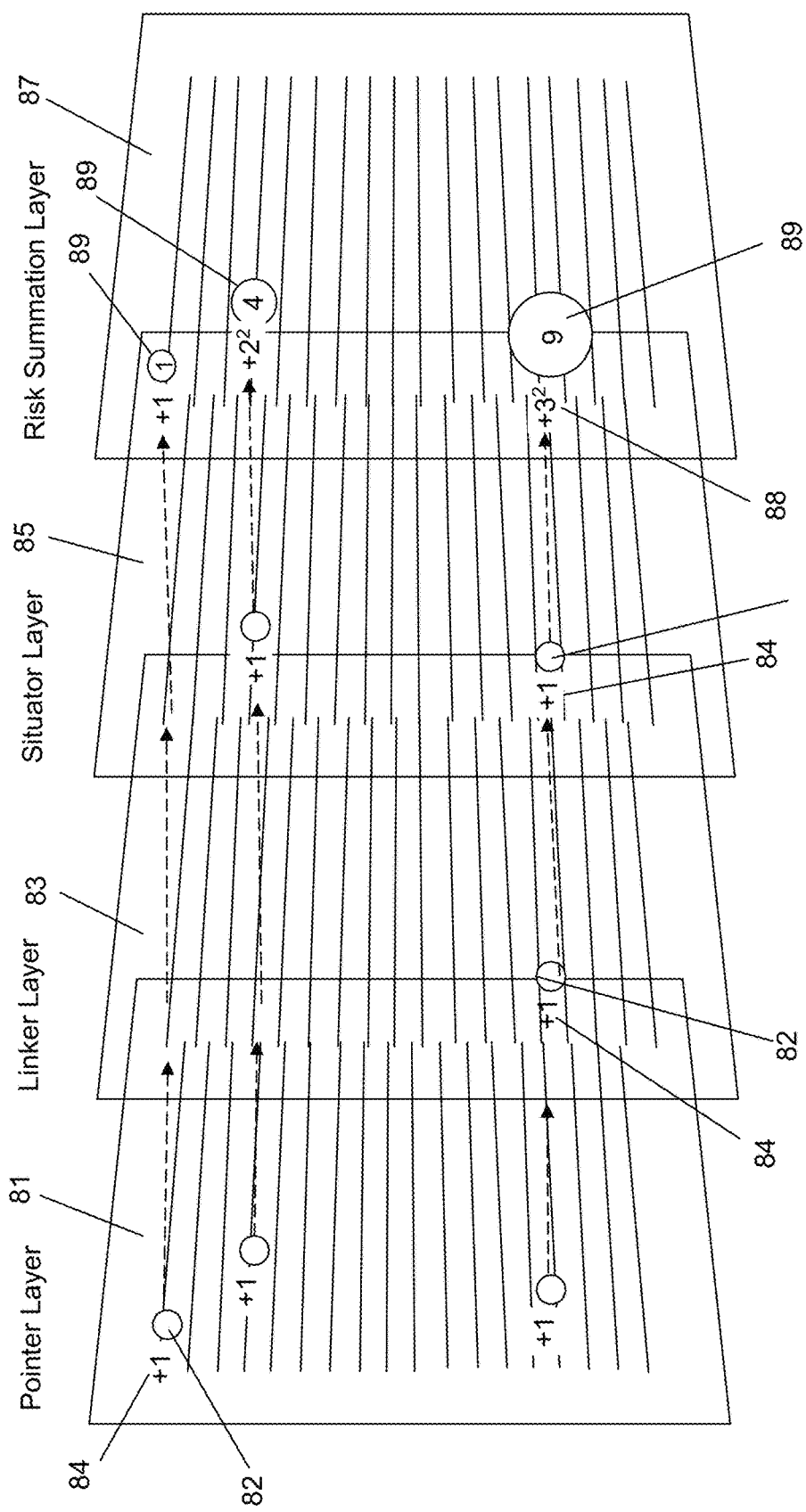
FIG. 10 is a diagrammatic representation of identified risks and ranking in an embodiment of the Vital Text Interface (VTI) of an embodiment of the VTAS of the present invention.

As shown in FIG. 9, each identified risk type 67 consists of four modules: a risk detector 69 which identifies a pattern of linguistic entities which are associated with a high frequency of risk; a risk assessor 71 which refers to markup in the VTCO 34 as well as any relevant corpora to determine the likelihood that the given risk pattern is problematic in the current context; a risk type display element 73 which appears in the VTI adjacent to the location of the risk pattern in the text and explains the nature and severity of the risk and offers methods of remediation; and content from the E4E curriculum 75 matched to the risk type that helps the user understand the linguistic nature of the risk type and how to avoid this type of risk in the future. The Risk Assessor 39 performs an assessment based on the E4E framework 50 through an analysis of the Risk Elements 65 with respect to each structural class 43, as shown in FIG. 10. A first analysis assesses the severity of risk of each Risk Element 65 with respect to the usage and context of the pointers 45 within the Risk Element 65. A coordinate indicator 82 that may be color coded or otherwise highlighted to indicate risk within the document 22. The pointer assessment is shown within a Pointer Layer 81 display of the Vital Text Interface 40. An assessment is performed with respect to the linkers 47 and coordinate indicator 82 is displayed within a Linker Layer 83. A further assessment of a Risk Element 65 of with respect to the usage of situators and their context within the Risk Element 65 is performed and a coordinate indicator 82 is displayed within the Situator Layer 85. In a first embodiment, a ranking 84 of +1 may be used to indicate each Risk Element 65 within each display layer. By separating the risk assessment into the distinct structural classes 45 and layering the results of the assessment with a ranking 84 for each Risk Element 65, the rankings may be combined and a total ranking may be calculated where Risk Elements 65 that invoke one or more structural classes indicate an exponential increase in risk that can be calculated as an Exponential Ranking 88 and be displayed as Ranking Result 89. Therefore a Risk Element 65 that invokes both pointers and linkers within a Risk Element 65 would receive a ranking of 4 as indicated within the Risk Summation Layer 87 in Vital Text Interface and a ranking that invokes pointers, linkers and situators would receive an Exponential Ranking 88 and Ranking Result Ranking 9.

The Vital Text Interface (VTI) 40 has three critical functions; 1) the VTI 40 allows the document author to easily find each Risk Element 65 in the text of the original document 22 as described (whether the Risk Element 65 is a single local issue, defect or error or an issue, defect or error that relates to many specific instances across the document); 2) the VTI 40 provides information about the nature of the Risk Element 65 which will typically begin with a concise on-screen report, using a pop-up or similar device display, that will also provide a link to the relevant parts of the E4E framework 50 that allows an author to pursue further information as needed; 3) the VTI 40 also provides guidance and resources relevant to repairing each identified issue, risk or defect using the E4E curriculum 99 based on the E4E framework 50. These resources provided by the E4E curriculum 99 may include offering a list of possible alternate terms, a listing of two or more possible interpretations, a suggestion about how a particular possible interpretation can be blocked, and explications related to the Risk Element 65 and salient terms within the document 22.

The E4E curriculum 99 is a comprehensive, but very compact, pedagogical grammar of English. It is practical and focused on the work that documents do. It aims to show how a small set of intuitively accessible fundamental principles account for most of the structure of English texts. It does not neglect the irregularities and eccentricities that attract much attention in traditional grammars and style books, but attempts to position these matters clearly in relation to more general and more central matters of sentence and text structure. This grammar is presented in the form of a large set of very compact 'articles', ranging in length from just a few words to a few sentences. These are hierarchically arranged and indexed in such a way as to allow an author to enter the E4E curriculum 99 using the VTI 40 at any point relevant to a particular issue, and then to follow related threads either up to more general issues, or down toward finer specifics of realization within a current or previously authored document 22. The author may select any suggestion, alternate term or phrase using a mouse and the Risk Element 65 is replaced and corrected.

A particular focus of the E4E curriculum 99 is on the concept of a document ontology 101. Technical documents in particular are often ones that assume that the reader commands a relatively large body of specialist background information that includes knowledge of a complex field of entities that are defined by their spatiotemporal properties, their behavior, and their interactions with other entities. Many documents then attempt to carry the reader from this background ontology 103 to an appreciation of the altered document ontology 101 that incorporates either a changed view of some of the assumed entities, extends the background ontology 103 with new entities, or in some instances argues for dispensing with some previously assumed entities. The obvious fact that different readers commonly approach a given document with different backgrounds and assumptions, i.e., with different ontologies, constitutes one of the central challenges in assessing any document. But in technical documents this challenge is often particularly acute when the document is meant to be accessible to multiple reader groups (i.e., groups that vary in their specialist background, expertise, and goals).

Figure 11:
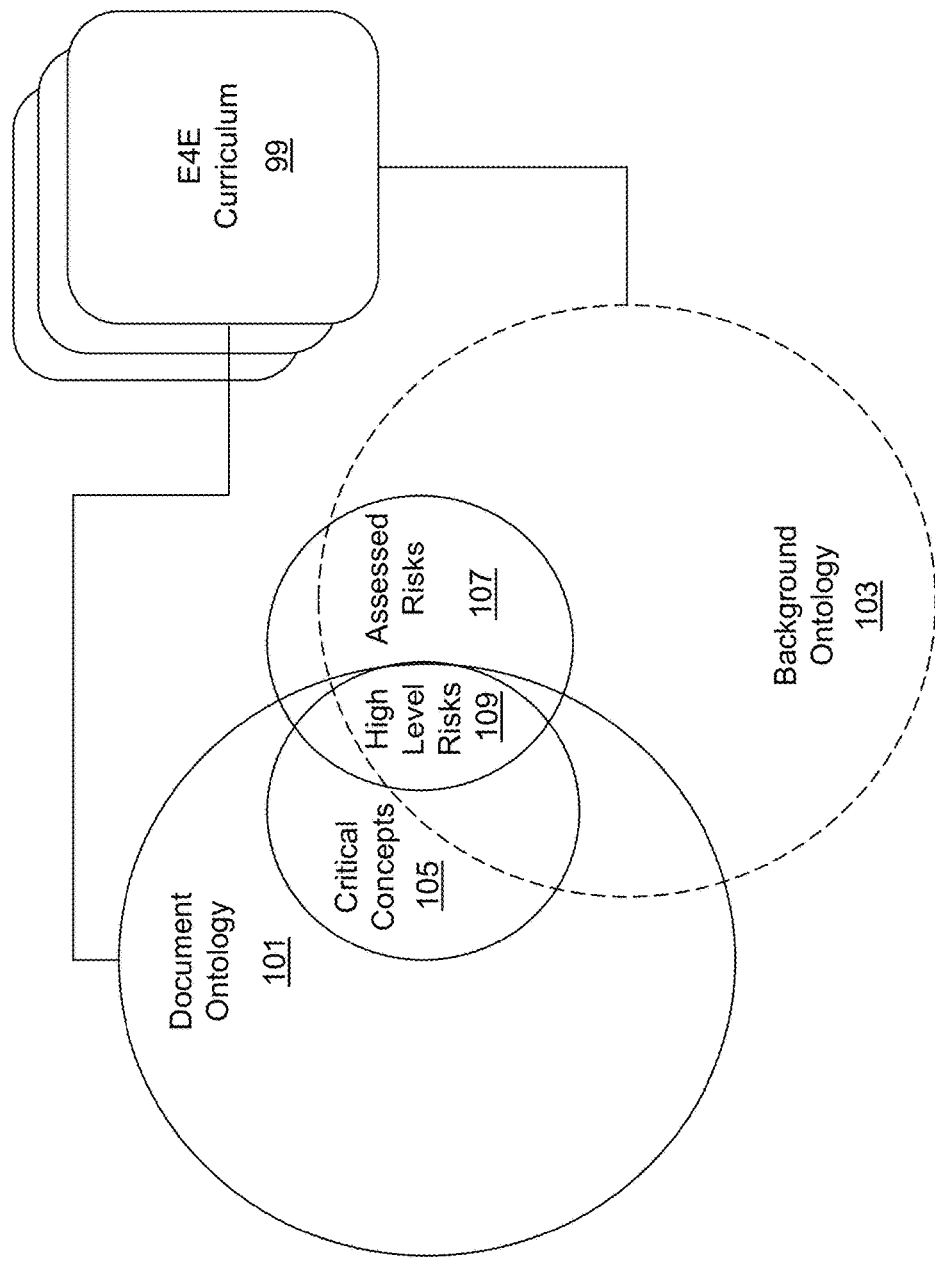
FIG. 11 is a Venn diagram of overlapping ontologies and the E4E curriculum in an embodiment of the VTAS of the present invention.

As shown in FIG. 11, each ontology provides critical concepts 105 that if misunderstood may result in increased risk of improper use or injury in using a technology. From the reader's perspective the assessed risks 107 increase if the reader approaches a document from knowledge of an alternative background ontology 103 and the document does not adequately provide the changes and separations of the new technology from previously assumed concepts and entities in that alternate ontology 103. Particular separation and comprehension must be provided to reduce the severity of the High Level Risks 109 where the ontologies overlap. The E4E curriculum 99 provides both the information for the author to properly realize the risks associated across ontologies through the use of definitive sentence structure and the tools to improve writing skills to consider the importance of a reader's perspective in comprehending the critical concepts 105 and depth of meaning of the requirements within a document as it relates to the document ontology 101.

In a first embodiment, the ontological development process begins with a list of terms created from the VTAS analysis stage. This Ontology List 79 of terms is then reviewed by the author or a data analyst 48 and the terms are arranged in priority order. Terms are selected and 'allocated' to a list that may be presented to experts to provide explications 92 of terms selected in each requirements document. A table that coordinates the list of allocated terms with experts is maintained. Each expert is then notified through a voicemail message, text message, email or other notification method and the expert is presented with a web link to access the document and terms within the document needing explication. The notification may provide the expert with a 'closing date' by which time they must complete the explication 92 or solicit a 'commitment date' from the expert to complete one or more explications. The VTAS provides a template 91 to the expert for the completion of the explications 92. The template is pre-filled with all information that is available about the term from internal sources of the current Vital Text Concept Library (VTCL) 90 and from external sources such as common databases available through a company's network or from the Internet. The explication display system within the VTI 40 of the present invention also provides for multiple explications 92 for any single term, where a selected term may already possess an explication completed by a previous expert, if a different usage is in play within the document under review then an additional explication is entered.

These alternatives and additional elements of language can be presented in the manner of a Concept Map 100 that both articulates the specific properties of terms, as well as displays their relations to each other, and to general (non-company-specific) usages of the same terms. A Concept Map 100 creates a visual representation of the relationships between the salient terms within the document. Automated processes using the VTAS as well as the manual review in developing the Concept Map 100 reveals weaknesses and omissions within the document. Concepts of higher level are often decomposed into their representative parts or components. Through processing of the Concept Map representations, the trained data analyst is focused on missing requirements, underdeveloped higher level concepts, defect producing weaknesses and other risks of misinterpretation.

The VTAS 20 provides not only the explications of terms as used in a given contextual event and at a given point in time, but also the tools for tracking ongoing changes in both internal and external usages using continuous updating through the on-going analysis of further requirements documents. The mask and characteristics of the concepts collected by this ontological analysis is fed to the Vital Text Concept Library (VTCL) 90 repositories from which further analysis may be performed. The Vital Text Concept Library (VTCL) 90 is the primary tool that describes the various characteristics of the concepts that wear these masks (terms), and the circumstances in which they wear them. It is the context of the concept wearing the mask that enables the discovery that one term or phrase may be playing different roles creating a risk of ambiguity and misinterpretation. The Concept Library (VTCL) 90 of the VTAS 20 further provides for grouping of terms within general solution areas and within general or specific industry vocabulary sets. The terms and explications or definitions may then be statistically ranked and presented to the author or user working on the document with alternative and additional elements of language (nouns, verbs, etc.) and phrases reflecting specificity and relevance to best describe the desired concept. In this way, the Vital Text Concept Library (VTCL) 90 is an alternate pathway that builds a database of company-specific terminology.

The Library 90 is formed from information obtained from crowd sourcing, and group sourcing, as well as from analyses of company documents creating a base of information that constitutes an empirically grounded analyses of the unique ways in which terms are used within the company's internal and external communications. Vital Text Concept Library (VTCL) terms and phrases presented for language refinement further permit an author or data analyst to select and deselect language and effect a new requirements statement based on the enhanced language to address risks and defects within the document 22.

The automated editing process within the VTI 40 that accesses the Vital Text Concept Library (VTCL) 90 may include company specific terms 74, terms from an external dictionary, a review of terms using public reference information or other sources for reference. The public reference information 76 may be for example through a search of a lexical database such as WordNet that may group terms from the company specific terms 74 and public reference information 76 into sets of synonyms or synsets to be stored within an Ontological List 79. The Ontological List 79 may be used in the Vital Text Document Model (VTDM) processing to tag identified terms and phrases within the document 22. The synsets may provide short, general definitions and semantic relationships between the salient terms within the Ontological List 79. The Ontological List 79 may further be used to contribute to the development of unique target words and phrases 77 of interest that may be chosen by the author to request explications in order to identify critically distinctive usages of industry specific and/or enterprise.

A chosen target key word or phrase may undergo an analysis to accumulate information employed to construct descriptive information topologies of each target phrase. The information is collected using a conversational guidance process to gain information from those who possess exceptional understanding or are interacting with and using the product using what is known herein as a group sourcing method. Additional information about the target phrases is collected from those who are peripheral to the use and understanding of the technology product using what is known herein as a crowd sourcing method. Group sourcing is not used in this meaning as a general term where participation is open to anyone, but instead is restricted to those members within the technology community that have been selected by the author or one or more group source members who request the elicitation of information from these participants. Crowd sourcing is also not the general public but instead are users of the technology that are associated more broadly within the company. Although, in some instances where security of corporate concepts or terms is not a concern then true public crowd sourcing methods may be employed to enhance understanding in the document(s).

Figure 12:
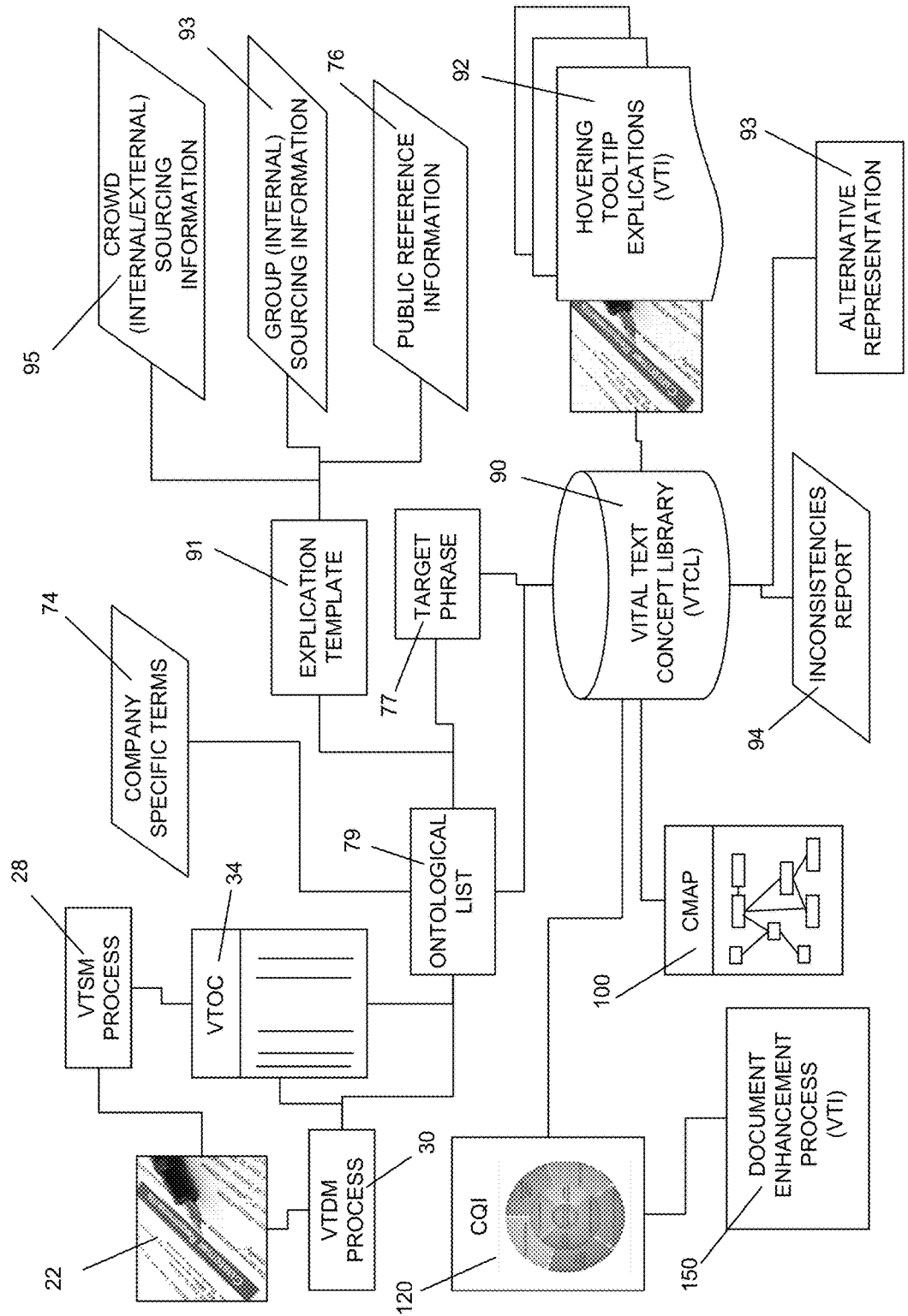
FIG. 12 is a flow diagram of an embodiment of the development of explications on identified targets in an embodiment of the VTAS of the present invention.
Figure 13:
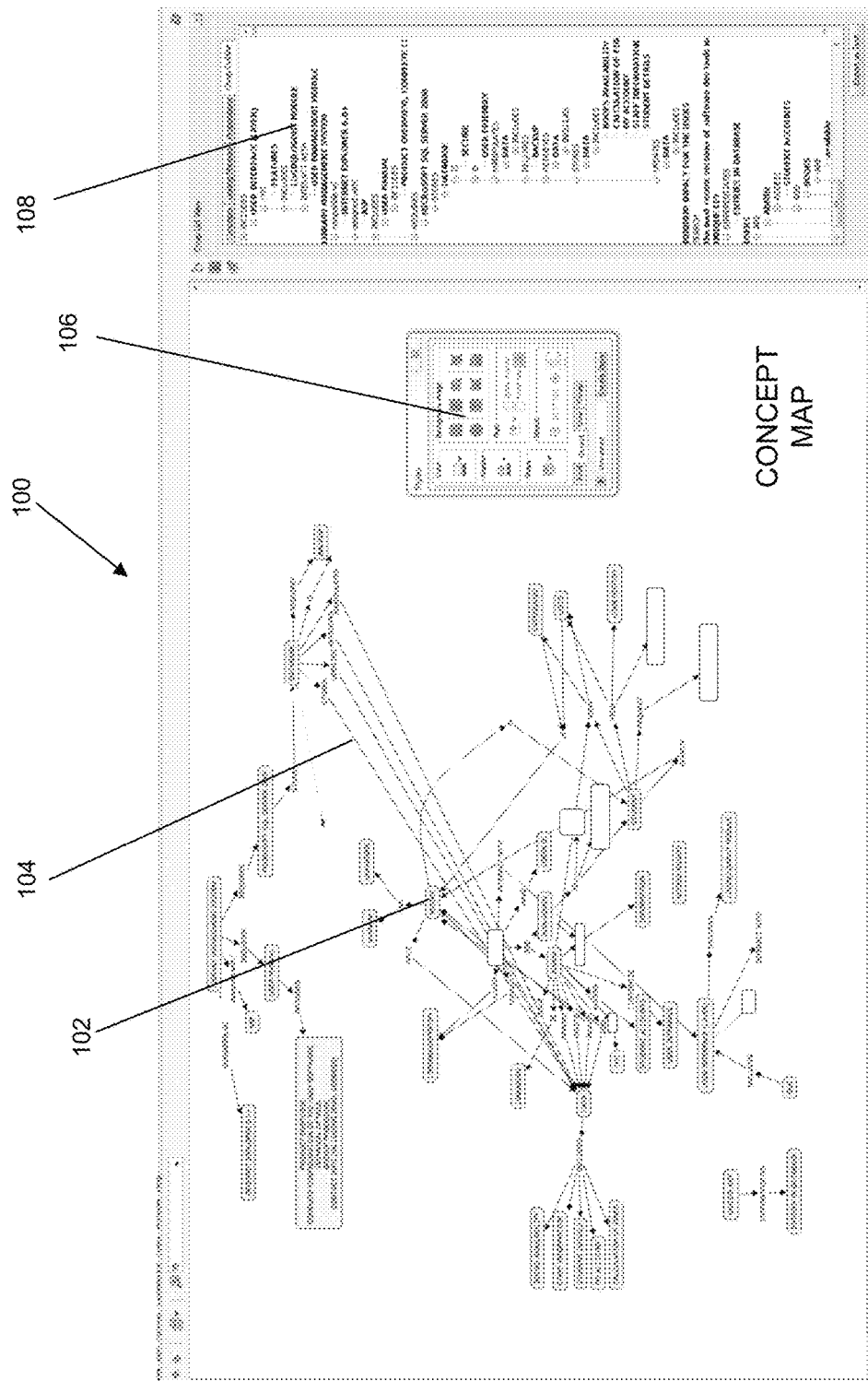
FIG. 13 is a diagrammatic presentation of an embodiment of a Concept Map in an embodiment of the VTAS of the present invention.

Using the Ontological List 79 as shown in FIG. 12, the VTAS application software 20 generates a guidance explication template 91 that includes specific questions directed to inconsistencies in use of the target key word and provides specific questions associated with the technology and the target key word or phrase. The explication template 91 may be directed to a group member and/or a crowd member is constructed and is reviewed and amended as required by a data analyst 48. The explication templates 91 are forwarded to a group source participant(s), such as an appropriate expert of the company, a crowd source participant(s), or general user that may be internal or external to the company but that is associated with the technology of the company.

The guidance explication template 91 may be an interactive conversation between a data analyst 48 and one or more group source members, with the data analyst collecting the information, or the data may be gathered remotely where the explication template 91 is forwarded to one or more crowd or group source members and is monitored by the author or data analyst 48. The guidance explication template 91 may be tailored specifically for the recipient of the explication template so for example a group source explication template may have additional requests for information when compared to a crowd source explication template. The structure of the explication template 91 using the VTAS 20 provides for automated extraction and compilation of each answer provided by one or more participant. Each answer to a question may be combined and presented in a color coded format, where for example each color denotes group participant information 93 or crowd participant information 95. The color coding assists the data analysts 48 in the review of the explication template results 91 that are the definitions and data collected evaluate information that may be used to assist in developing definitions and explications for the targeted terms. The information gathered from the explication templates 91 is stored in the Vital Text Concept Library (VTCL) 90. The VTAS 20 employs a variety of methods to automate the collection of data and support the data analysts 48 who may be experts from the corporate enterprise and experts within the community at-large. The VTAS application software 20 provides unique discriminator algorithms and a range of methods to manage, measure and control collection ratios from specific corporate locations, enterprise wide locations and selections from the world at large depending upon how broad or specific the requirements information and acquired information is to populations of usage.

In an embodiment of the present invention, the methods of the VTAS application software 20 assist in determining when the circumstances warrant the establishment of outside populations who can address information acquisition from a more diverse pool of members outside the corporate structure. The VTAS 20 may apply an extended contribution base of crowd source members that are peripheral to but acquainted with aspects of the technology products. This contribution base may provide broader modeling and longevity to the analysis that may be extended over time. However, at times the representations to be constructed will not benefit from a peripheral virtual workforce that extends beyond members of the immediate corporate community and this broader modeling may not be used.

Following the collection of information into a descriptive information format, from one or more group and/or crowd source members, the attributes are stored within the Vital Text Concept Library (VTCL) 90 and provided with appropriate indexing. The VTCL 90 may be newly created for the specific project within the domain or be updated from an earlier related project. The collected information is indexed using metadata in several unique ways to identify, the date, time, place and context of the acquisition of the information and to identify the party contributing the information including their background and relationship to the project. This broad information is used as each explication template response associated with a target phrase is evaluated for the purposes of creating a target phrase explication. This descriptive explication 92 is most heavily based on information provided by the group source explication template results to properly define the target phrase within the context of the internal company nomenclature. Explication template results are further analyzed to create alternate explications or representations 93 with specific criteria that make the alternate signifier for the given target concept more predictable as it pertains to the image it is meant to provoke in the mind of the reader of the requirements document 22. The purpose of developing alternative explications to the original target phrase 77 is to provide alternative representations 93 satisfying the six attributes of quality communication as described in further detail below.

Using the Vital Text Interface (VTI) 40, the targeted terms are highlighted, color coded or indicated otherwise in the requirements document 22 and are tagged or otherwise annotated in the VTCO 34 to assist with a manual review that is performed to identify terms related and connected to terms identified as Risk Elements 65 that may be problematic to comprehension and/or are known to be correlated with defects. As part of the manual review, the highlighted terms are displayed in a Concept Map 100 and are identified as nouns, verbs, adjectives, adverbs or other parts of speech (POS) and may be designated with color coding with distinct shapes to identify relationships that visually represent ontologies of the document. Shaping and color coding may present such visual information as terms and concepts which occur at specific levels of decomposition within the document. Information such as levels of decomposition assist a data analyst 48 trained in the Linguistic Sciences to quickly ascertain terms and concepts which are viable to be matched and correlated against decomposition criteria and defects. Executing this type of analysis may more readily identify underspecified concepts and underdeveloped terminology.

Figure 14:
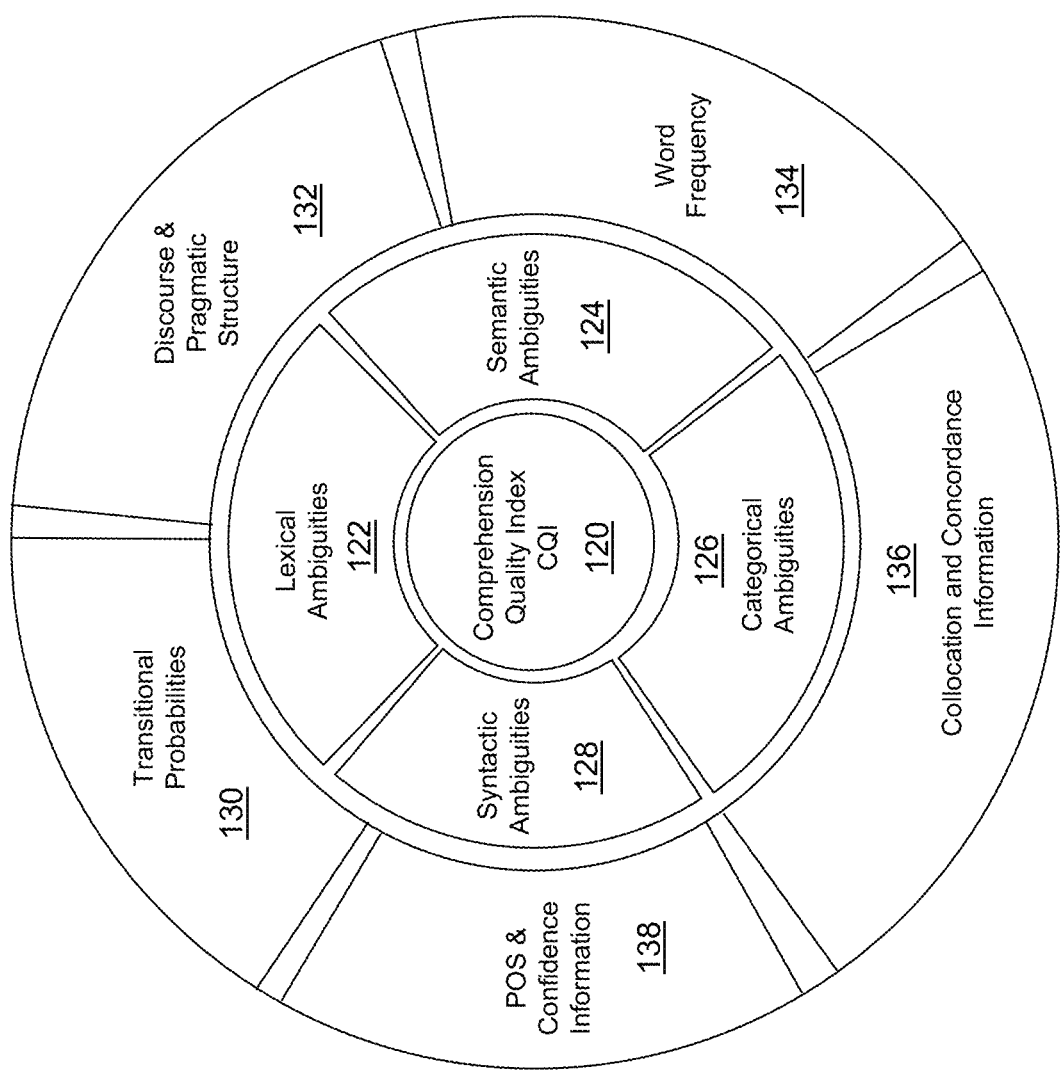
FIG. 14 is a diagrammatic presentation of an embodiment of the elements used in determining the Vital Text Quality Index (VTQI) in an embodiment of the VTAS of the present invention.

Each term is added to the Concept Map 100 only once and lines are used to denote the "is-a", "part-of", "has" and other possession and recurring relationships. Using the Concept Map 100, the identified nouns and selected target phrases 77 are identified and tagged using meta-data with attributes defined from the results of the VTSM 28 and VTDM 30 analyses based on the E4E framework and from the Risk Elements 65 identified by the Risk Detectors (RD) 38. The Concept Map 100, as shown in FIG. 14, may display identified nouns 102 in a specific color and shape. Connecting lines 104 identify relationships between terms within the document 22. Other forms of speech such as verbs and adjectives related to the identified noun may be shown in other colors and shapes. A legend 106 labeling shapes and colors may be provided. A navigator 108 to search and find identified terms within the document may also be provided. The Concept Map 100 may be constructed based on specific sections of one or more documents where a careful review of selected terms and their relationships may be performed. Relationships between structural classes 43 within Risk Elements 65 may be identified and highlighted, for example where a group of pointers 45 identifying the structure of a device such as component 1 with component 2 and with component 3 are put together to make assembly 4, sections within the document that only note components 1 and 3 without component 2 may be highlighted. Further, relationships between an identified pointer 45 with a specific situator 49 such as a modifier adjective or an identified pointer 45 with a specific linker 47 may also be identified and highlighted. The Concept Map 100 also identifies pointers 45 that are not connected in relationships to other terms, and any terms that are used in such a manner that are connected to two or more other terms in a way that would identify a Risk Element 65 that may create an ambiguity, such as through multiple theta roles or noun clusters.

The visual inspection of the Concept Map 100 allows an analyst 48 to evaluate the completeness and appropriateness of a corporate or technological ontology of these identified target terms. The Concept Map 100 also provides for the VTAS 20 to use automated methods to process the map 100 and perform specific analysis throughout the document or a corpus of documents to begin to construct successively extended diagrams across group, division, company, enterprise terminology and their associated references. These identified target terms and the relationships identified in the Concept Map 100 are stored in the Vital Text Concept Library (VTCL) 90 where they may be selected for risk assessment to identify the intersections of the depth and breadth of each identified target term and phrase and their relationships with other high, medium and low frequency target phrases 77. The identified targets may be pointers that as described above are the world of conceptual words and phrases that exist within the requirements engineering documents 22. The Concept Map 100 includes a processor that traverses the Concept Map entries and evaluates the structural classes 43 and relationships within the document 22 based on the E4E framework. From this evaluation three dimensional (3D) models are constructed to display the strength and redundancy in the relationships of the things within the document to assist in the review of these relationships. The constructed 3D models may illustrate the parts of an assembly that can be separated into an exploded parts diagram or software modules that may be diagrammatically displayed to show cross-overs and interactions of components or modules to identify risks or inconsistencies in design in the operation of the software. These discrete associations may pictorially represent the relationships or lack of connection between concepts within the requirements documents. These physical models may assist stakeholders in improving the integration of the conceptual components to reduce failures and improve software and product design and reliability.

From the relationship data presented in the Concept Map 100 key words or target phrases 77 may be identified and categorized and grouped using the VTSM 28 and VTDM 30 processing and be stored within the Vital Text Concept Library (VTCL) 90. A comparative analysis may be performed on each identified key word or target phrase 77 to match the phrase to company specific terms associated with the engineering requirements. The Vital Text Concept Library (VTCL) 90 may also be used to search for the identified target phrases 77 and label these targets in other requirements documents 22 within the current project or in other project domains. Iterative searching may be performed as new documents are added to the project and new target phrases 77 are identified. This iterative process provides target phrases 77 and key words that are identified as crucial to the comprehension of the needs, the stakeholders are communicating through the document(s) under consideration.

An initial comparative search may be performed on the Ontological List 79. The search compares the target words and phrases 77 to company specific terms 74 that are compiled and stored within the Vital Concept Library (VTCL) 90 to identify engineering and technological terms specific to the industry or applied science discipline of the company or stakeholder. Definitions of terms discovered in this search may be associated with the selected targets 77. The group and crowd explication information 93 and 95 provides further information to assist in identifying target words and phrases 77 that require further analysis. A data analyst 48 performs a further review of the assessment targets 77 and the search results and may tag some targets as having no or minimal interest and therefore mark them for removal from further analysis. The data analysts 48 then determines a set of most critical targets and phases 77 that indicate some form of ambiguity and require closer analysis and inspection. The selected targets 77 may be presented to company members 46 to determine if the targets 77 are acceptable or if there are substantial omissions. These selected targets with the data associated with these targets are stored within the Vital Text Concept Library (VTCL) 90.

The selected targets 77 are chosen based on information provided in the Concept Map 100 related to frequency of occurrence, location, concordance values, collocation, depth of occurrence, breadth of occurrence, the data analyst's review and other parameters to identify the most critical targets. This target compilation 77 may further include lemma variants of the target information to assist in determining proper use and definitions of the selected targets 77 within the requirements documents 22. A first target 77 is selected and an ontological analysis is performed. The VTAS 20 highlights each instance of the selected target 77 within the requirements document 22 and based on an E4E framework analysis of the structural classes 43 of the targets 77 within a sentence 51 and section 53. Risk Detectors (RD) 38 may further apply Risk Patterns 63 to the targets 77 to develop an inconsistencies report 94, where Risk Elements 65 are identified where the targets 77 may be ambiguous, a clear definition of the target is not provided, or the meaning of the target may be misinterpreted.

The results from the series of linguistic analysis performed and the complete sentence and paragraphs surrounding a target provides for clear and direct assessment of each of the identified targets 77. For example, thresholds may be set for frequency or distribution, to assist in identifying targets and any targets that exceed these thresholds are highlighted and color coded. The thresholds are determined using the VTAS through an iterative analysis based on frequency and usage of terms within a number of requirements documents within the analyses. The VTAS 20 may further provide a comparative match of N-grams and identify inconsistencies where the target 77 may commonly be associated with a specific term within 1 or 2 words of the target 77 and any instances where this relationship does not exist may be highlighted. These relationships are provided on the Concept Map 100, so verification of the analysis may be easily confirmed.

These identified terms are also highlighted to the author of the document as critical terms that should be contextually reviewed to make certain they are clearly defined and communicated. The VTAS 20 further provides the author and requirements engineers 46 with the ability to locate and place additional terms from the requirements document 22 into the Ontological List 79 for explication or further analysis or allow the author to remove immaterial targets from further analysis.

The VTAS 20 using the E4E framework employs automated methods to augment the understanding of the target phrases 77 selected through this analysis process. Modified original definitions or explications 92 are developed from this analysis and from the explication template data collected 91 by local group members 85. The explications 92 are a best alternative phrasing that is developed through an automated evaluation using semantic and syntactic principals to indicate risk levels of the use of redundant and/or circular terminology to define critical terms or the omissions of critical description for critical terms within the requirements document 22.

Representations 93 that provide alternative definitions and related interpretations to the target 77 are also developed and a topology is formed based on each target phrase 77. As described above, the topology may include one or more alternate uses of the target key word or phrase 77 as used in one or broader technology disciplines. By providing this range of uses of a target, a data analyst 48 or systems developer 46 may better understand how a term may be interpreted by a user of the technology product that is outside or not related to the company. The topology further highlights problem areas where a misinterpretation may present a greater risk to the user where a greater number of topological alternatives demonstrate that a term may be widely used, but poorly defined.

The explications 92 therefore crafted to meet specific quality requirements to augment the enhanced meaning component developed through the ontological analysis and other VTAS processes. Obtaining guidance from a variety of sources, these explications 92 and representations 93 must possess the following qualities: Freedom from obscurity; Freedom from circularity; Freedom from otherwise non-predictiveness. Additional constraints are: No excessive information, meaning that a definition must contain no information that could over-constrain the target phrase 77 concept being described relative to that provided during creation of the descriptive information record; No insufficient information meaning that the candidate target phrase 77 lacks no information that by its absence could under-constrain the concept being represented that was provided during creation of the descriptive information record; No erroneous information meaning that it contains no information that is not consistent with that provided during higher meaning attribution; and finally these alternative to the original phrasing within the documents 22 must be written entirely in relative semantic primitives. "Relatively primitive" is equated to a level of complexity at which agreement occurs spontaneously between two separate minds about the meanings of words (without need of paraphrase or other description).

Explications 92 and representations 93 are added to the VTCL 90 and are highlighted within the documents 22 to be reviewed by the data analyst 48 for accuracy. The Vital Text Interface 40 displays the explications 92 and representations 93 using a hovering dialog box that provides for a member of the company 46 to review and accept or reject the insertion of explication 92 or representation 93 definitions and phrasing. Using this unique feature of the VTAS 20, corporate company employees have access to an updated global Vital Text Concept Library (VTCL) 90 containing all the explications 92, representations 93, their usages, their descriptive information, using the E4E curriculum 99 and the statistical rankings of the VTQI 120 as described herein and many other elements of information about the concepts that exist within their corporate enterprise.

Within the VTI, visual representations known to provide enhanced human factors are employed to provide clues to the requirements document consumers about which terms possess further clarification in the Vital Text Concept Library (VTCL) 90 or in other ways and means. Using this specific feature, the ability for the consumer to hover over the term to extract and display information specific to comprehension of the term from the perspective of the reader is a unique feature of the VTAS 20. The Vital Text Concept Library (VTCL) 90 is iteratively updated with these explications 92 and representations 93 and these may be used throughout multiple projects to enhance descriptions and provide searching strategies to reuse preferred terminology to improve future requirements documents and specifications. Through the VTCL 90 and E4E curriculum 99, the VTI 40 provides additional visual and textual information about the terms and concepts within the requirements document allowing the author to more effectively visualize and understand the topology of the terms employed thus raising comprehension and correct Risk Elements 65 and defects based on this information.

As the detected Risk Elements 65 are resolved, a display of the Vital Text Quality Index (VTQI) 120 shows a real time index of overall document quality. Additionally, each risk type is linked via an info button or equivalent device to content from the E4E curriculum 50, including text descriptions, examples, tutorials, videos, apps, and games that educate the user as they work with the product. The quality of each user's work is monitored by their own individual VTQI 120 as is their educational level as evidenced by their use of these educational materials.

A ranking value is established for the explications 92 and representations 93 based on the adherence to the quality requirements, similarity to the original definitions and the topology of usage of the phrasing within the requirements documents 22. This important feature of the VTAS 20 provides for a user of the system to select a term definition of lower ranking and easily review and compare commonly interpreted meanings from sources peripheral to the stakeholders. The ranking 120 may further identify omissions of information that may be critical to understanding the use and implementation of the technology product through the topology provided and provide for the refinement of the original meaning of a target phrase 77 initially used within the document 22 or provided by the group source members. Using the discriminator algorithms of the VTAS 20, the selection of an explication 92 or alternative representation 93 may also be ranked as more preferred or less preferred, for example. Additional rankings may be based on a comparison of the frequency of usage of specific internal company terms being used to define a target, with a lower ranking given to those explications that become circular and fail to use the general meanings of terms or use the terms in a context that is incomplete, or in contrast to how the term is commonly used. The ranking is integrated with other statistical measures of the comprehensibility of the requirements documents 22 and with the number of identified Risk Elements 65, the diversity of users of the documents 22 and other measures. Each of these rankings contributes to the Vital Text Quality Index (VTQI) 120 to produce a reliable, reproducible overall ranking providing a valuable indicator for required improvements and risk evaluation within a corpus of requirements documents.

The VTAS 20 further establishes an enhancement network 150 of members of different domains of experience to a common usage and to other supporting information and attributes of the target key word or phrase 77. For example, a medical researcher delivering requirements to be consumed by a software engineer demonstrates that persons from two occupations may not often communicate about the concepts and items at an equal level. By locating terms within a hierarchical structure of related terms to 'normalize' the communications between them the VTAS enhancement process 150 of the present invention produces a more comprehensible common usage scenario of the terms employed.

An evaluation and ranking may be applied to the target words and phrases 77, their frequencies and locations, the identified topologies and the quality of the explications 91 and representations 93 to contribute to the Vital Text Quality Index (VTQI) 120. As noted herein, the VTQI 120, as shown in FIG. 9, is derived from an analyses focused on distinct aspects within the requirements document 22 related to assessing the frequency and severity of the ambiguities and related uncertainties, specifically the Lexical Ambiguities 122, Syntactic Ambiguities 124, Semantic Ambiguities 126, and Categorical Ambiguities 128 within the identified targets, topologies, representations and definitions. The VTQI 120 may be calculated and applied to a document, where a higher point value may denote a higher frequency of Risk Elements 65 that may indicate potential ambiguities and therefore a higher assessment of risk for a document or set of documents. The application of the VTQI 120 provides for a tangible correlation of risk to a correlation of improvement as misinterpretation risks are identified and amended through the identification of Risk Elements 65 and acceptance of more well-suited explications 92 and representations 93 thereby reducing the overall VTQI value 120.

The VTQI assessment 120 is a broad based evaluation that it is not simply the number or quantity of violations but also the quantity per number of real aspects of the requirements that, as shown in FIG. 14, evaluate the Transitional Probabilities 130; the Discourse and Pragmatic Structure 132; the Target Word Frequency 134, Collocation and Concordance Information 136; and Part-of-Speech (POS) Tags and associated Confidence Values 138. A scale rating that compiles scores within each of these aspects may be based on, for example, a fixed grand total of 100 that incorporates a ratio of the quality of the content of the requirements documents 22 to the identified 'violations' would act to increase the VTQI value 120. In this evaluation, the VTQI analysis includes the length of the document and a comparison to rated difficulties per segments to determine an overall lower score that would be adjudged as better overall document quality than a document with a greater number of violations within the aspects of analysis. For example, a document of 500 pages could have 100 violation penalties and still be better overall, i.e. present a lower risk for significant defect development, than a document of 20 pages with only 10 penalties, in the extreme. In determining this VTQI value 120 additional factors are considered to account for the statistical variants such as multiple authors, differences in document lengths, densities of violations per section of document and other influences.

In a first embodiment, the evaluation scheme may employ a raw score from violation counts through the identification of ambiguities an defects that is then adjusted by scores based on these other more global or structural considerations. Rules constructed to determine the VTQI 120, weight severity of risk based on how costly the violation of each rule has been proven to be for development in the defects generated, the inefficient time utilization and in other costs. A VTQI 120 that correlates with more costly development grows higher in the overall rating.

Ambiguities are scored in terms of their frequency and distribution where higher concentrations of ambiguities in specific sections of the requirements document drastically raise the VTQI 120, as do concentrations of different kinds of ambiguities (lexical, semantic, etc.) within a specific section. Higher values are also given to collections of requirements that contain violations within close proximity to each other and therefore are (presumably) harder to deconstruct whereas more isolated cases of ambiguity raise the VTQI value 120 to a lesser extent.

As indicated by color coding, relationships between the types of ambiguities and aspects of evaluation may be indicated. Within this analysis aspects such as Word Frequency 134, Collocations and Concordance Information 136, and Transitional Probabilities 130 may be used to determine scores for Discourse and Pragmatic Structure and Structural Cohesiveness 132 rather than evaluations being constructed from these aspects, however influence from these aspects may affect the overall evaluations and scores. Aspects of Discourse and Pragmatic Structure and Structural Cohesiveness 132 may require human interpretation (deployed through a variety of methods like group sourcing, AMT, Cloud sourcing and others) based on questions targeted to reader comprehension.

Through risk detection and assessment using and the VTAS 20 and the information provided using the E4E curriculum, the present invention substantially raises comprehension of corporate writing and communication efficiencies resulting in enhanced information comprehension. With enhanced comprehension there is a substantial increase in information velocity because classical "roadblocks" associated with misunderstandings are diminished. Information flows faster and continuous improvement of corporate communications is the result.

The invention has been described in detail with particular reference to certain preferred embodiments thereof, but it will be understood that variations and modifications can be effected within the spirit and scope of the invention.

What is claimed is:

1. One or more non-transitory computer-readable media including computer instructions for performing a method comprising:
    using a central processing unit (CPU) connected via a network to a remote storage device, to process requirements documents stored in the remote memory device;
    identifying, using the CPU, one or more of a plurality of strings consisting of one or more words in a requirements document as corresponding to at least one of a plurality of lexico-syntactic structural patterns;
    querying a first database contained in a second memory device, to obtain a list of lexico-syntactic structural patterns associated with ambiguity and interpretive uncertainty arising in the cognitive functions invoked in a reader in reading the text;
    annotating, using the CPU, the plurality of strings consisting of one or more words as one of at least a pointer, a linker, and a situator as the structural elements of the lexico-syntactic structural patterns linked to ambiguity and interpretive uncertainty in the cognitive functions invoked in a reader in reading the text;
    querying a second database contained in a third memory device, to obtain a set of one or more risk patterns associated with the lexico-syntactic structural patterns, the second database comprising a plurality of risk patterns having at least one of the plurality of known strings consisting of one or more words susceptible to ambiguity and misinterpretation and the plurality of lexico-syntactic structural patterns, the plurality of risk patterns being separate from the plurality of lexico-syntactic structural patterns;
    creating, using the CPU, a network having a plurality of nodes corresponding to the sets of lexico-syntactic structural patterns and risk patterns and weighted links between the sets of lexico-syntactic structural patterns and risk patterns;
    utilizing, using the CPU, machine learning algorithms to build risk assessors to identify lexico-syntactic structural patterns as risk elements that invoke ambiguity and interpretive uncertainty within the cognitive functions invoked in a reader in reading a text incorporating the lexico-syntactic structural patterns;
    constructing, using the CPU, at least one explication that specifies alternative strings consisting of one or more words comprising salient terms from a risk elements; and
    displaying, using the CPU, the explications within a user interface to be selected by a user to address ambiguities and misinterpretations within at least one requirements document.

2. The one or more non-transitory computer-readable media including computer instructions for performing a method of claim 1 comprising identifying, using the CPU, text of the risk element within the text of the entire document; and
    creating, using the CPU, a document ontology comprising the text of a plurality of risk elements.

3. The one or more non-transitory computer-readable media including computer instructions for performing a method of claim 2 comprising identifying, using the CPU, text of the risk element within the text of an entire corpus of documents; and
    creating, using the CPU, a corporate ontology comprising the text of a plurality of risk elements.

4. The one or more non-transitory computer-readable media including computer instructions for performing a method of claim 3 comprising constructing, using the CPU, a severity of risk value from the sets of lexico-syntactic structural patterns and risk patterns and weighted links between the sets of lexico-syntactic structural patterns and risk patterns.

5. The one or more non-transitory computer-readable media including computer instructions for performing a method of claim 4 comprising constructing, using the CPU, a quality index from the severity of risk value of all risk elements within one of at least the entire document and entire corpus of documents.

6. The one or more non-transitory computer-readable media including computer instructions for performing a method of claim 1 comprising:
    querying a third database contained in a fourth memory device, to obtain data to construct, using the CPU, a concept library, the data comprising a series of linguistic analyses of terms from one or more requirements documents and from one of at least group sourcing, crowd sourcing, and external resources;
    aggregating, using the CPU, the collected data with salient terms and phrases that are stored as an ontological list within the concept library; and
    transforming, using the CPU, the structural relationship of a pointer, linker and situator of at least one risk element using the collected data from the concept library;
    constructing, using the CPU, explications and alternative strings consisting of one or more words from the salient terms and phrases and data collected within the concept library.

7. The one or more non-transitory computer-readable media including computer instructions for performing a method of claim 6 comprising constructing, using the CPU, at least one explication comprising attributes of the salient terms and phrases;
    identifying the attributes based on a topology of the salient terms and phrases within a domain or category of relevant terms or concepts; and
    storing salient terms and phrases within the corporate ontology based on the topology.

8. The one or more non-transitory computer-readable media including computer instructions for performing a method of claim 7 comprising displaying, using the CPU, within the user interface training materials within a curriculum including at least one risk element and a transformation of the risk element displayed as at least one explication as alternative strings consisting of one or more words comprising salient terms from the lexico-syntactic structural patterns and a plurality of alternate explications and representations within the one or more requirements documents to offer alternative strings consisting of one or more words comprising salient terms from the lexico-syntactic structural patterns to replace the text of one or more risk elements identified within the one or more requirements documents.

9. The one or more non-transitory computer-readable media including computer instructions for performing a method of claim 6 comprising utilizing, using the CPU, algorithms to perform a series of linguistic analyses to include one of at least frequency of occurrence, location, concordance values, collocation, depth of occurrence, breadth of occurrence data.

10. The one or more non-transitory computer-readable media including computer instructions for performing a method of claim 6 comprising:
constructing, using the CPU, a concept map, the concept map comprising mapping of the usage, definitions, synonyms and semantic relationships of the salient terms and phrases.

11. The one or more non-transitory computer-readable media including computer instructions for performing a method of claim 10, comprising displaying, using the CPU, collected data and salient terms and phrases in the concept map in different shapes and color coded based on the severity of risk value and quality index.

12. One or more non-transitory computer-readable media including computer instructions for performing a method comprising:
using a central processing unit (CPU) connected via a network to a remote memory device, to process requirements documents stored in the remote memory device;
parsing, using the CPU, text from one or more requirements documents;
converting, using the CPU, the text to a machine readable format;
utilizing, using the CPU, algorithms to perform a plurality of linguistic analyses on the formatted text including the identification of structural components of text;
identifying, using the CPU, one or more of a plurality of strings consisting of one or more words in a requirements document as corresponding to at least one of a plurality of lexico-syntactic structural patterns;
querying a first database contained in a second memory device, to obtain a list of lexico-syntactic structural patterns associated with ambiguity and interpretive uncertainty based on the cognitive functions invoked in a reader in reading the text;
annotating, using the CPU, the structural components of strings consisting of one or more words identified within the text from at least one requirements document as one of at least a pointer, a linker, and a situator as the structural elements of lexico-syntactic structural patterns linked to ambiguity and interpretive uncertainty within the cognitive functions invoked in a reader in reading the text;
compiling, using the CPU, the results of a plurality of linguistic analyses performed and the annotations of the strings consisting of one or more words from at least one sentence into a computational object module to construct risk patterns comprising text susceptible to ambiguity and misinterpretation based on a relationship between all or a part of any text annotated as a pointer, linker, and situator and the identification of the annotated text within a structural class that invokes ambiguity and misinterpretation within the cognitive functions of a reader;
storing the risk patterns within a second database contained in a third memory device;
querying the second database contained in the third memory device, to obtain a set of one or more risk patterns associated with the lexico-syntactic structural patterns, the second database comprising associations between a plurality of risk patterns and at least one of the plurality of known strings consisting of one or more words susceptible to ambiguity and misinterpretation and the plurality of lexico-syntactic structural patterns, the plurality of risk patterns being separate from the plurality of lexico-syntactic structural patterns;
applying, using the CPU, the risk patterns through the comparison of the relationships between all or a part of the text annotated as one of at least a pointer, a linker, and a situator and other annotated text, the risk patterns capable of inducing ambiguities and misinterpretations;
identifying, using the CPU, risk elements as annotated text matching an applied risk pattern;
identifying, using the CPU, salient terms and phrases from the identified risk elements and constructing an ontological list based on the depth and breadth of meaning of a salient term in relation to other terms within the document, salient terms having greater depth present a greater opportunity for ambiguity and misinterpretation, salient terms having greater breadth present a meaning that is different from common usage;
compiling, using the CPU, within the ontological list definitions, synonyms, and semantic relationships of the salient terms to identify alternative elements of language and phrases;
transforming, using the CPU, the structural relationship of one of at least the pointer, linker, and situator of a risk element based on the salient terms and structural class to construct at least one explication as alternative text comprising the alternative elements of language and phrases; and
displaying, using the CPU, the explications within a user interface to be selected by a user to offer options to address ambiguities and misinterpretations within at least one requirements document.

13. The one or more non-transitory computer-readable media including computer instructions for performing a method of claim 12, comprising:
utilizing, using the CPU, algorithms to perform highlighting the one or more identified risk elements in the one or more requirements documents; and
creating, using the CPU, a network having a plurality of nodes corresponding to the sets of lexico-syntactic structural patterns and risk patterns and weighted links between the sets of lexico-syntactic structural patterns and risk patterns;
utilizing, using the CPU, algorithms to refine weighted links in the network to assess the one or more risk elements for severity of risk based on the quality of the matching of the risk element to the risk pattern.

14. The one or more non-transitory computer-readable media including computer instructions for performing a method of claim 12, comprising:
constructing, using the CPU, an explication template that includes attributes of the salient terms and phrases and identifying the attributes based on the topology of the salient terms and phrases within a domain or category of relevant terms or concepts.

15. The one or more non-transitory computer-readable media including computer instructions for performing a method of claim 14 comprising constructing, using the CPU, explications for the salient terms and phrases from the explication templates completed by one or more experts.

16. The one or more non-transitory computer-readable media including computer instructions for performing a method of claim 15 comprising storing, using the CPU, the one or more of the explications within a concept library database.

17. The one or more non-transitory computer-readable media including computer instructions for performing a method of claim 16 comprising creating, using the CPU, a topology from the one or more identified risk elements and explications to construct an ontology and one or more alternate ontologies.

18. The one or more non-transitory computer-readable media including computer instructions for performing a method of claim 17 comprising utilizing, using the CPU, algorithms to rank the requirements document based on the one or more identified risk elements and explications; and
displaying, using the CPU, the ranking within the one or more requirements documents.

19. The one or more non-transitory computer-readable media including computer instructions for performing a method of claim 17 comprising displaying, using a CPU, a plurality of explications as text;
selecting, using a CPU, one of the plurality of explications to replace a risk element in the one or more requirements documents within training materials.

20. One or more non-transitory computer-readable media including computer instructions for performing a method comprising:
using a central processing unit (CPU) connected via a network to a remote storage device, to process requirements documents stored in the remote memory device;
identifying, using the CPU, one or more of a plurality of strings consisting of one or more words in a requirements document as corresponding to at least one of a plurality of lexico-syntactic structural patterns;
querying a first database contained in a second memory device, to obtain a list of lexico-syntactic structural patterns associated with ambiguity and interpretive uncertainty based on the cognitive functions invoked in a reader in reading the text;
annotating, using the CPU, structural components of the text of at least one requirements document as one of at least a pointer, a linker, and a situator as the structural elements linked to the cognitive functions invoked in a reader in reading the text;
querying a second database contained in a third memory device, to obtain a set of one or more risk patterns associated with the lexico-syntactic structural patterns, the second database comprising associations between a plurality of risk patterns and at least one of the plurality of known strings consisting of one or more words susceptible to ambiguity and misinterpretation and the plurality of lexico-syntactic structural patterns, the plurality of risk patterns being separate from the plurality of lexico-syntactic structural patterns;
utilizing, using the CPU, algorithms to perform a matching comparison of relationships between all or a part of any source text annotated as a pointer, linker, and situator to a plurality of risk patterns, the plurality of risk patterns comprising text annotated as at least one of a pointer, linker, and situator susceptible to ambiguity and misinterpretation; and
identifying, using the CPU, source text matching at least one of the plurality of risk pattern as a risk element and storing the risk element within at least one structural class of risk patterns that invoke ambiguity and misinterpretation within the cognitive functions of a reader;
transforming, using the CPU, the structural relationship of one of at least the pointer, linker, and situator of a risk element to construct at least one explication as alternative text to remove ambiguity or risk of misinterpretation from the risk element; and
displaying, using the CPU, the at least one explication within a user interface to be selected by a user to repair ambiguities and misinterpretations within at least one requirements document.

* * * * *